United States Patent
Lee et al.

(10) Patent No.: US 11,799,507 B2
(45) Date of Patent: Oct. 24, 2023

(54) CONFIGURABLE RECEIVE PATH FOR MIXER-FIRST OR AMPLIFIER-FIRST SIGNAL PROCESSING

(71) Applicant: QUALCOMM Incorporated, San Diego, CA (US)

(72) Inventors: Jang Joon Lee, San Diego, CA (US); Kyle David Holland, San Diego, CA (US); Jian Kang, San Diego, CA (US); Aleksandar Miodrag Tasic, San Diego, CA (US); Chih-Fan Liao, San Diego, CA (US); Yingying Li, San Diego, CA (US); Lai Kan Leung, San Marcos, CA (US); Chiewcharn Narathong, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,499

(22) Filed: Sep. 22, 2021

(65) Prior Publication Data

US 2023/0089220 A1 Mar. 23, 2023

(51) Int. Cl.
*H04B 1/26* (2006.01)
*H04B 1/16* (2006.01)

(52) U.S. Cl.
CPC .................................. *H04B 1/1638* (2013.01)

(58) Field of Classification Search
CPC .... H04B 1/109; H04B 1/1027; H04B 1/1638; H04B 17/318; H04B 17/336; H04B 2210/006; H04B 1/71637
See application file for complete search history.

(56) References Cited

U.S. PATENT DOCUMENTS

| 7,480,495 B2 * | 1/2009 | Matsushima | .......... H04N 7/102 725/100 |
|---|---|---|---|
| 9,525,447 B1 | 12/2016 | Wu et al. | |

(Continued)

OTHER PUBLICATIONS

Borremans J., et al., "A 40 nm CMOS 0.4-6 GHz Receiver Resilient to Out-of-Band Blockers", IEEE Journal of Solid-State Circuits, Jul. 2011, vol. 46, No. 7, pp. 1659-1671, Jul. 1, 2011, XP011356591, ISSN: 0018-9200, DOI:10.1109/JSSC.2011.2144110, The whole document.

(Continued)

*Primary Examiner* — Nhan T Le
(74) *Attorney, Agent, or Firm* — Norton Rose Fulbright US LLP/Qualcomm Incorporated

(57) ABSTRACT

Embodiments of this disclosure may include a receiver with a reconfigurable processing path for different signal conditions. Such a receiver may reconfigure between a mixer-first configuration and an amplifier-first configuration. In the mixer-first configuration, an RF input signal is not passed through an LNA for amplification before processing the RF input signal for downconversion to baseband and eventual extraction of the information in the signal. In the amplifier-first configuration, an RF input signal is passed through an LNA for amplification before processing the RF input signal for downconversion to baseband and eventual extraction of the information in the signal. Reconfiguring the receiver between mixer-first and amplifier-first configurations may be performed based on detection of jammer signals and/or measurement of signal-to-noise ratio (SNR).

28 Claims, 10 Drawing Sheets

(56) References Cited

U.S. PATENT DOCUMENTS

| | | | |
|---|---|---|---|
| 2003/0159156 A1 | 8/2003 | Fulga et al. | |
| 2006/0009177 A1* | 1/2006 | Persico | H04B 7/082 |
| | | | 455/143 |
| 2007/0262817 A1 | 11/2007 | Ciccarelli et al. | |
| 2010/0041359 A1 | 2/2010 | Liu et al. | |
| 2011/0281541 A1* | 11/2011 | Borremans | H04B 1/18 |
| | | | 455/307 |
| 2013/0142287 A1* | 6/2013 | Kravets | H04B 1/1027 |
| | | | 375/316 |
| 2017/0366138 A1 | 12/2017 | Mu et al. | |
| 2023/0044098 A1* | 2/2023 | Nimbalker | H04L 5/0048 |

OTHER PUBLICATIONS

International Search Report and Written Opinion—PCT/US2022/075771—ISA/EPO—dated Dec. 13, 2022.
Poobuapheun, N., "LNA and Mixer Designs for Multi-Band Receiver Front-Ends", Electrical Engineering and Computer Sciences, University of California, Berkeley, 2009, 215 Pages.

* cited by examiner

CONFIGURABLE RECEIVE PATH FOR MIXER-FIRST OR AMPLIFIER-FIRST SIGNAL PROCESSING

TECHNICAL FIELD

Aspects of the present disclosure relate generally to wireless communication systems, and more particularly, to radio frequency (RF) processing circuitry for wireless communication systems. Some features may enable and provide improved communications, including improved receiver functionality.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Wireless signals received at a wireless device, whether base station or user equipment, may have a small signal strength. The wireless devices may include amplifiers for increasing the signal strength to aid in processing the signal and extracting the transmitting information from the signal. Low noise amplifiers (LNAs) are amplifiers having electronic components that amplify a signal to generate a higher strength signal that improves processing of the signal and increases the likelihood of successfully recovering data embedded in the signal. LNAs operate on low-power signals, such as the small signals received over a small antenna in a small mobile device. LNAs operate on these small signals without causing a significant loss in signal-to-noise ratio (SNR) of the received signal. However, interference from other wireless device increases the difficulty of recovering the data from the signal. For example, large jammer signals can mask the desired signals, and may saturate the LNA and/or other RF components such as the baseband filter. When a component is saturated, the data embedded in the signal may be lost.

Conventional solutions have become less effective as the spectrum for conveying information in wireless signals is more crowded. One conventional solution is to position an attenuator before the LNA to reduce jammer signals. However, this solution may consume power, which is disadvantageous for wireless devices, and the combination of the attenuator and the LNA may create non-linearities that result in loss of information from the signal. Another conventional solution is to use LNA linearization techniques, but these also consume power, which is disadvantageous for wireless devices. Further, LNA linearization techniques have large variation and need calibration.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

BRIEF SUMMARY OF SOME EXAMPLES

Embodiments of this disclosure may include a receiver with a configurable processing path adaptable for different signal conditions. Such a receiver may reconfigure between a mixer-first configuration and an amplifier-first configuration. In the mixer-first configuration, an RF input signal is not passed through an LNA for amplification in the receiver before processing the RF input signal for downconversion to baseband and eventual extraction of the information embedded in the signal. In the amplifier-first configuration, an RF input signal is passed through an LNA for amplification in the receiver before processing the RF input signal for downconversion to baseband and eventual extraction of the information embedded in the signal. Reconfiguring the receiver between mixer-first and amplifier-first configurations allows the receiver to adapt to different RF input signals. For example, for RF input signals co-existing with large jammer signals, the receiver may be configured in mixer-first mode to provide highly-linear performance and to reduce the likelihood of saturating RF components in the receiver. As another example, the mixer-first configuration may be used for processing RF input signals with high signal-to-noise ratio (SNR), in which amplification may or may not be useful in the receiver but the received SNR is sufficient for processing without further amplification. In some embodiments, the mixer-first configuration may reduce power consumption by allowing the LNA to be disabled. In some embodiments, the mixer-first configuration may allow use of cheaper filters in a radio frequency front end (RFFE) coupled to the receiver or may allow removal of filters from the RFFE. In some embodiments the reconfiguration may extend from reconfiguring the receiver to include reconfiguring the RFFE. For example, when the receiver is in a mixer-first configuration, the RFFE may be reconfigured to disable amplifiers and/or filters in the RFFE. Such a configuration may further improve the linearity of the wireless device or avoid the loss from the filters in processing RF input signals. When conditions on the RF input signal are determined to be not suitable for processing in the mixer-first configuration, the receiver may be configured to the amplifier-first configuration. Switching between the mixer-first and amplifier-first configuration may be performed with a mode-based SNR or RF-detector-based SNR measurement.

Wireless devices with configurable receivers and/or RFFEs may improve the likelihood of extracting information from a wireless signal during processing of the wireless signal. Part of the improvement is obtained by configuring the receiver in a mixer-first mode to reduce interference from jammer signals. A jammer is an undesired signal component that may be much higher in amplitude than a desired signal component and may be located close in frequency to the desired signal component. Jammer signals may exist, for example, when multiple wireless communication systems co-exist. In one example, the coexistence may be between long and short range wireless communication systems, such as with 5G signals coexisting with Wi-Fi signals. In another example, the coexisitence may be between two long range wireless communication systems operating in a similar frequency band, such as with 5G signals coexisting with 4G signals. In a further example, the coexistence may be between two radio access technologies (RATs) even when the RF signals for the RATs are separated in frequency space, such as 5G mmWave signals coexisting with 5G sub-7 GHz signals. In the 5G mmWave example, the 5G mmWave IF signals, downconverted from mmWave RF signals, may overlap in frequency space with the 5G sub-7 GHz signals and/or be located at harmonics of the 5G sub-7 GHz signals. The coexistence of these signals on the same or nearby transmission paths (e.g., located in proximity to each other or more generally in the same integrated circuit or on the same substrate) may create spurs in the signal paths for the sub-7 GHz and mmWave IF signals. Jammer signals may also exist, for example, with co-existence of signals from the same communication system on different carriers, such as 5G signals on one carrier coexisting with 5G signals on another carrier. The jammer signal issue increases when the communication system supports carrier aggregation, in which devices transmit and/or receive related information on multiple carriers simultaneously. The jammer signal issue is further increased when different RF signals are processed on the same integrated circuit (IC). The mixer-first configuration may allow processing of RF input signals with different carriers and/or technologies in a single-chip IC by using the mixer-first configuration for 5G sub-7 GHz RF signals but allowing the receiver to reconfigure for amplifier-first configuration to process 5G mmWave RF signals.

In some embodiments, the frequency downconversion in a receiver may be configured with a double-balanced mixer, single-balanced mixer, or single-balanced mixer with a dummy mixer. A dummy mixer is a mixer operating based on the same local oscillator (LO) signals as the main mixer but does not receive the RF input signal or receives the input signal but does not generate an output, or the output of which is not processed for data. The dummy mixer may be used to minimize noise contribution from the local oscillator (LO) in a baseband signal. When a single-balanced mixer with a dummy mixer is used, the main mixer and dummy mixer of the receiver may be reconfigured to process signals differently in the mixer-first and amplifier-first configurations. For example, one of the main mixer or the dummy mixer may process the RF input signal in a mixer-first configuration and the other of the main mixer or the dummy mixer may process the RF input signal in an amplifier-first configuration. The re-use of the main and dummy mixers by switching which mixer receives the RF input signal for downconversion may separate the mixer degeneration components for mixer-first and amplifier-first configurations. In some embodiments, the amplifier-first configuration may include a mixer degeneration resistor (RRF) to improve linearity; however, typical values of the RRF affect the input impedance matching for mixer-first configuration and hence, the mixer with RRF may be disfavored for mixer-first configuration. In some embodiments, a tunable input switch and a gain control element are included in the mixer-first configuration for input impedance matching and receive signal gain control.

In one aspect of the disclosure, a method includes processing an RF input signal in a receiver in an amplifier-first configuration through a first mixer and determining whether criteria are met for switching to a mixer-first configuration for the receiver. When the determining results in determining the criteria are met, the method includes configuring the receiver to the mixer-first configuration and/or processing the RF input signal in the receiver in the mixer-first configuration through a second mixer. Determining whether criteria are met may include determining whether a signal-to-noise ratio (SNR) is above a threshold value and/or determining whether jammer signals with a signal strength above a threshold value are detected in the RF input signal. In some aspects, after configuring the receiver to the mixer-first configuration, the method may include determining whether second criteria are met for switching to an amplifier-first configuration for the receiver, and, when determining results in the second criteria being met, configuring the receiver to the amplifier-first configuration in which the second mixer is a dummy mixer and/or processing the RF input signal in the receiver in the amplifier-first configuration through the first mixer. The configuring to the mixer-first configuration may include bypassing an amplifier of the receiver, bypassing an amplifier of the RFFE, adjusting a gain control element before downconverting the RF input signal in the second mixer, toggling a switch to configure a processing path for the RF input signal through the gain control element and the second mixer, adjusting a gain control element coupled in parallel with a degeneration resistor, and/or closing a switch to couple the RF input signal, such as directly when a matching network is not desired, or through a matching network to the second mixer. In some aspects, the method may include determining whether the RF input signal comprises a carrier aggregation (CA) signal, and when the determining results in determining that the RF input signal comprises a CA signal, processing at least a first carrier of the CA signal in the amplifier-first configuration through the first mixer and/or processing at least a second carrier of the CA signal in the mixer-first configuration through the second mixer. In some aspects involving 5G mmWave and 5G sub-7 GHz operation, the processing at least a first carrier of the CA signal comprises processing a 5G mmWave RF signal through the first mixer and the processing at least a second carrier of the CA signal comprises processing a 5G sub-7 GHz RF signal through the second mixer.

In one aspect of the disclosure, an apparatus includes a receive port for receiving an RF input signal, a first mixer coupled to the receive port, a second mixer coupled to the receive port, a low noise amplifier (LNA) coupled between the receive port and the first mixer, and/or a switch coupled between the receive port and the LNA, wherein the switch is configured to toggle, at least in part, the receiver between an amplifier-first configuration and a mixer-first configuration. In some aspects, a second switch may be coupled between the LNA and the first mixer, coupled between the LNA and the second mixer, and configured to toggle the first mixer from a main mixer to a dummy mixer.

In an additional aspect of the disclosure, an apparatus is disclosed that includes logic circuitry such as at least one processor, and a memory coupled to the at least one processor. The at least one processor is configured to perform any of the methods or techniques described herein. For example, the at least one processor may be configured to perform steps including determining whether criteria are met for switching between the mixer-first configuration and the amplifier-first configuration, operating the switch based on whether the criteria are met, determining whether a signal-to-noise ratio (SNR) of the RF input signal is above a threshold value, and/or determining whether jammer signals with a signal strength above a threshold value are detected in the RF input signal. In some aspects, the logic circuitry may be configured to determine whether second criteria are met for switching to an amplifier-first configuration for the receiver, and when the second criteria are met, configure the receiver to the amplifier-first configuration and/or process the RF input signal in the receiver in the amplifier-first configuration through the first mixer.

In a further aspect of the disclosure, an apparatus is disclosed that includes a radio frequency front end (RFFE) coupled to the receiver. The RFFE may include a filter, a matching network, one or more switches, and/or a low noise amplifier. The logic circuitry may be configured to control at least one of the filter or the LNA of the RFFE based on whether second criteria are met. The receiver and RFFE may be separate integrated circuits (ICs), which may be coupled through a printed circuit board (PCB) and share components such as a power supply.

In another aspect of the disclosure, reconfiguring the apparatus between mixer-first and amplifier-first configurations may be performed by controlling a switch for bypassing the LNA; adjusting a gain of the RF input signal before downconverting the RF input signal in the second mixer; controlling a switch coupled between the LNA and the first mixer, coupled between the LNA and the second mixer, and configured to configure a processing path for the RF input signal through the gain control element and the second mixer in a mixer-first configuration; controlling a switch to activate a first processing path to the first mixer; controlling a switch to activate a second processing path to the second mixer; controlling a switch to process at least a first carrier of the CA signal through the first processing path comprising the LNA and the first mixer; controlling a switch to process at least a second carrier of the CA signal through the second processing path comprising the second mixer; controlling a switch to bypass a filter; and/or a means for reconfiguring the receiver between an amplifier-first configuration and a mixer-first configuration, wherein the amplifier-first configuration couples the receive port to the LNA and to the first mixer, and wherein the mixer-first configuration couples the receive port to the second mixer without passing through the LNA.

In an additional aspect of the disclosure, a non-transitory computer-readable medium stores instructions that, when executed by a processor, cause the processor to perform operations including those described in the method and techniques described herein and described in the operations of the logic circuitry. For example, the operations may include determining whether criteria are met for switching between the mixer-first configuration and the amplifier-first configuration, operating the switch based on whether the criteria are met, determining whether a signal-to-noise ratio (SNR) of the RF input signal is above a threshold value, and/or determining whether jammer signals with a signal strength above a threshold value are detected in the RF input signal.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
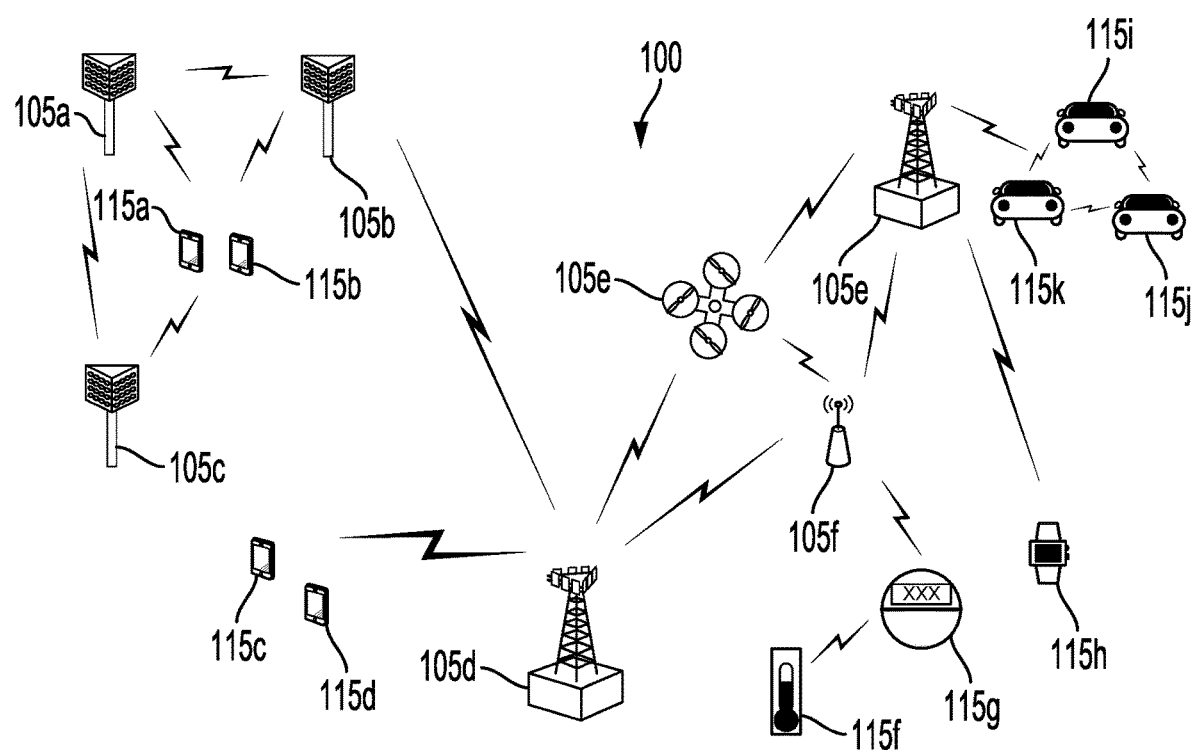
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communications (e.g., authorized shared access) between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles, and will be referred to herein as "sub-7 GHz". A similar nomenclature issue sometimes occurs with regard to FR2, which is often referred to (interchangeably) as a "millimeter wave" (mmWave) band in documents and articles, despite being including frequencies outside of the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-7 GHz" or the like if used herein may broadly represent frequencies that may be less than 7 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity. Either the base station 105 or the UE 115 or other devices communicating on the wireless network 100 (for example, a customer premises equipment (CPE)) may implement embodiments of receiver circuitry described herein.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of some implementations supports mission critical communications with ultra-reliable and redundant links for mission critical devices, such as UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
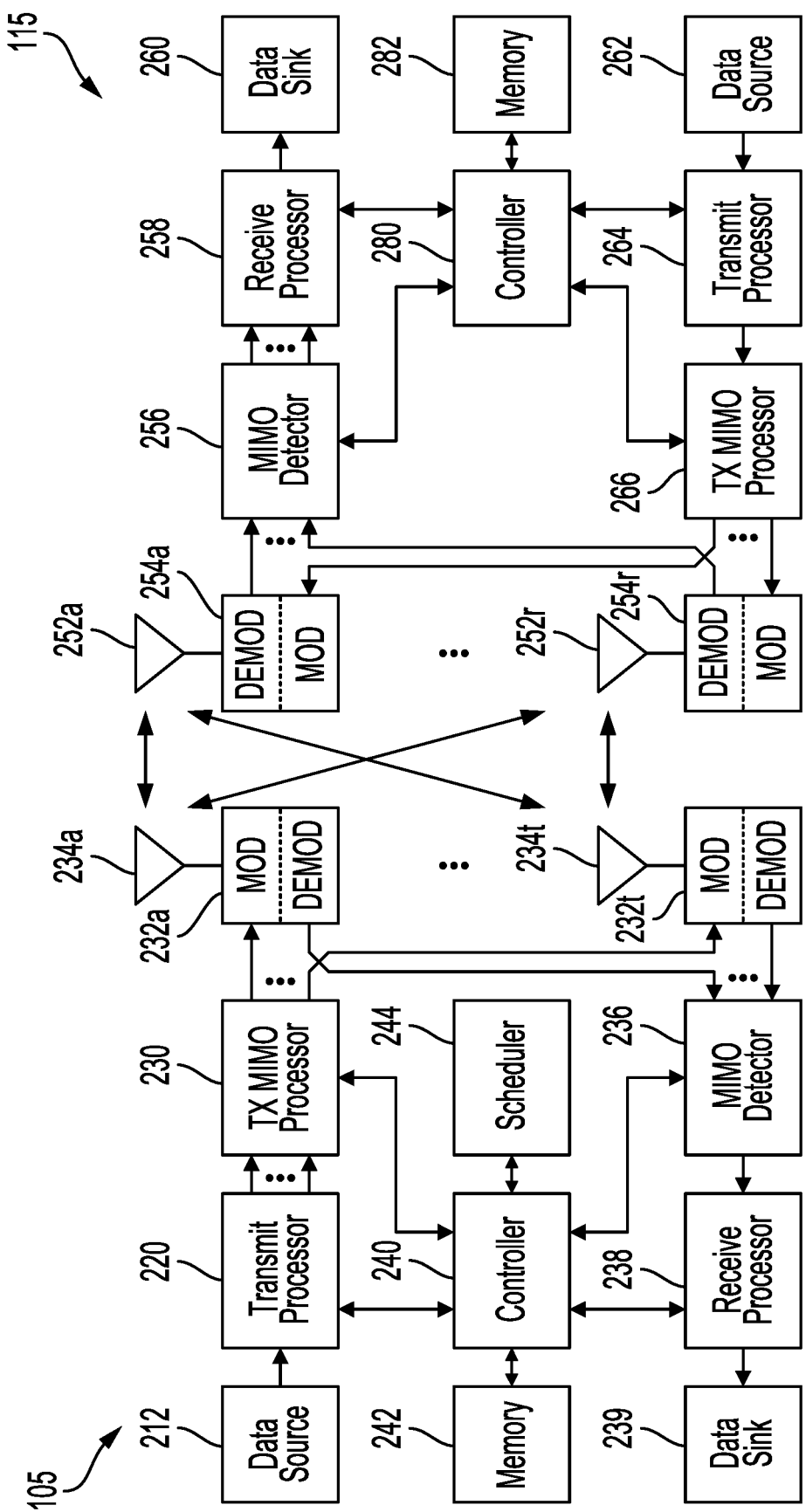
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes within the devices and/or the wireless network. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own back-off window based on the amount of energy detected on a channel or the acknowledge/negative-acknowledge (ACK/NACK) feedback for its own transmitted packets as a proxy for collisions.

While the description above refers to a UE 115 and base station 105, other configurations are possible. For example, the device 105 may be representative of a second UE, e.g., when two UEs are directly communicating without passing signals through a base station. In some such examples, the scheduler 244 is omitted. In other examples, the UE 115 may be representative of a second base station, e.g., when two base station are communicating wirelessly over a backhaul. In some such examples, a scheduler is included in the device 115.

Wireless devices, such as those described above in FIG. 1 and FIG. 2, may be configured with reconfigurable receivers and/or a RFFE, which may improve the likelihood of extracting information from a wireless signal during processing of the wireless signal. The mixer and receiver configurations described in embodiments herein may be used in the wireless devices shown in FIG. 1 and FIG. 2 as the demodulator DEMOD of 232a, 232t, 254a, and/or 254r. Part of the improvement is obtained by configuring the receiver in a mixer-first mode to reduce interference from jammer signals. A jammer is an undesired signal component that may be much higher in amplitude than a desired signal component and may be located close in frequency to the desired signal component. Jammer signals may exist, for example, when multiple wireless communication systems co-exist, such as 5G signals coexisting with Wi-Fi signals, 5G signals coexisting with 4G signals, or 5G mmWave IF signals coexisting with 5G sub-7 GHz signals. Jammer signals may also exist, for example, with co-existence of signals from the same communication system on different carriers, such as 5G signals on one carrier coexisting with 5G signals on another carrier. The jammer signal issue increases when the communication system supports carrier aggregation, in which devices transmit and/or receive multiple carriers simultaneously. The jammer signal issue is further increased when different RF signals are processed on the same integrated circuit (IC). The mixer-first configuration may allow processing of RF input signals with different carriers and/or technologies in a single-chip IC, for example, by using the mixer-first configuration for 5G sub-7 GHz RF signals but allowing the receiver to reconfigure for amplifier-first configuration to process 5G mmWave RF signals.

Figure 3:
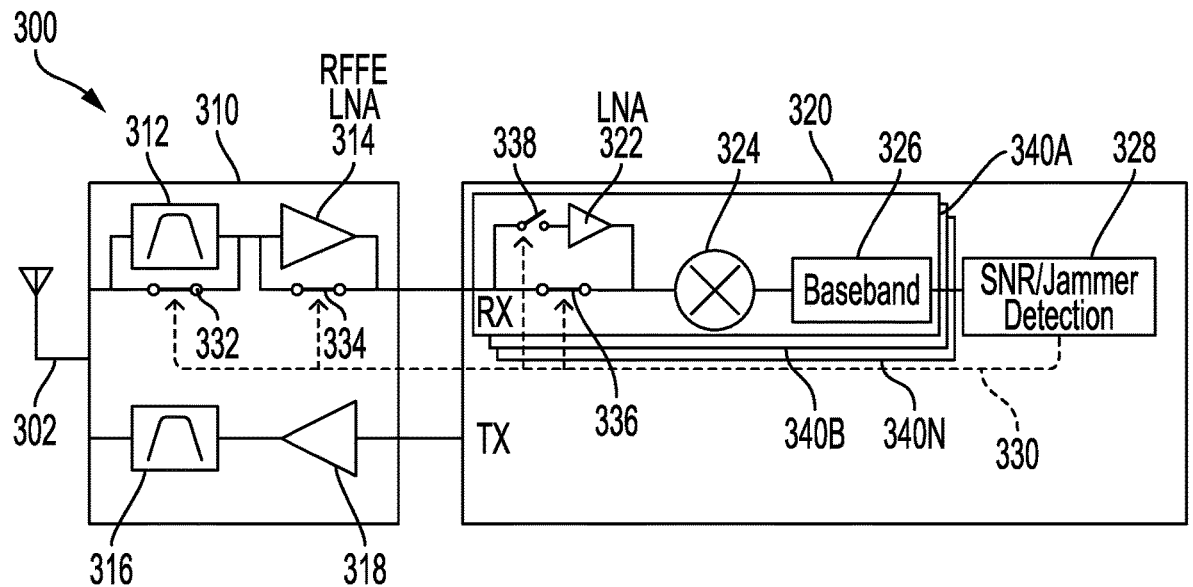
FIG. 3 is a block diagram illustrating RFFE and transceiver circuits with a reconfigurable capability for switching between mixer-first and amplifier-first according to one or more aspects.

FIG. 3 is a block diagram illustrating a circuit with a reconfigurable capability for switching between mixer-first and amplifier-first according to one or more aspects. A radio frequency (RF) circuit 300 may include a radio frequency front end (RFFE) 310 coupled to an antenna 302 through an antenna port. The antenna 302 may be an example of the antenna 234 or 252. The RFFE 310 may include a receive path and a transmit path and may share one or more components between the receive and transmit paths. In one example, the RFFE 310 may include a filter 312 and an amplifier 314, such as a low noise amplifier (LNA), in the receive path. The RFFE 310 may include a filter 316 and a power amplifier 318 in the transmit path. The RFFE may further include a mixer (not illustrated) and/or other components which are not illustrated. Components of the RFFE 310 may be implemented as discrete components, for example that are coupled to a printed circuit board (PCB) in the UE 115. In some examples, the RFFE 310 is implemented on a single IC or chip or in a single module. The RFFE 310 is coupled to a transceiver 320. A receive path of the transceiver 320 may include an amplifier 322, such as a low noise amplifier (LNA), a mixer 324, and/or baseband processing circuitry 326. The signal may be evaluated in a detection circuit 328, which may be configured to detect a signal-to-noise ratio (SNR) and/or to detect the presence of jammers in the signal. Although detection circuit 328 is shown as receiving a signal in the baseband domain, the detection circuit 328 may also or alternatively monitor conditions at the RF input signal input to the transceiver 320 and/or input to the RFFE 310. In some embodiments, the transceiver 320 is configured to support carrier aggregation (CA) by duplicating portions of a receive path and/or duplicating entire receive paths, such that each path may process different carriers that are simultaneously received. For example, the LNA 322, mixer 324, and baseband processing circuitry 326 may be duplicated in several receive paths 340A, 340B, . . . , 340N. The multiple receive paths 340A-N may also be used to separately process an in-phase channel (I-channel) and quadrature channel (Q-channel) in receivers configured for quadrature modulation. In some examples, the RFFE 310 and the transceiver 320 are included in the modulator/demodulator 232 or 254. In some examples, the detection circuit 328 is included in one or more of the processors 220, 238, 258, 264 and/or in the controller 240 or 280. In some examples, the transceiver 320 is implemented in a single chip or IC, e.g., in a transceiver chip. The LNA 322 and the mixer 324 may there be (at least selectively) coupled to a chip input (e.g., a pin on the chip) and configured to receive the RF input signal (e.g., via the chip input). In some examples, the detection circuit 328 is not included in that single chip or circuit and may instead be included, for example, in a modem or processor. In some examples, the RFFE 310 is coupled to the transceiver 320 via an interconnect, for example a cable or trace on a PCB on which both the RFFE 310 and the transceiver 320 are disposed. The interconnect may be coupled from an output of the RFFE 310 (e.g., a chip or module or discrete component output) to the chip input of the transceiver 320. The transceiver 320 may also include one or more transmit paths (not illustrated).

The circuit 300 may be configurable to support different receive configurations. For example, the circuit 300 may be reconfigured to operate in a mixer-first configuration or an amplifier-first configuration. In a mixer-first configuration, the RF input signal may be downconverted to baseband without amplification outside of the RFFE 310, such as by having no amplifier operate on the RF signal within the transceiver 320. In an amplifier-first configuration, the RF signal may be amplified in the transceiver 320 before downconversion to baseband, such that in some embodiments the RF signal is amplified in the RFFE 310 and the transceiver 320. The reconfiguration between mixer-first and amplifier-first configurations may be provided by switches, multiplexers, relays, or other components in the receive path of the circuit 300 that may change the receive path through the RFFE 310 and/or the transceiver 320. For example, switches 332 and 334 in the RFFE 310 may be configured in parallel with filter 312 and amplifier 314, respectively. When toggled on, the switches 332 and 334 may form a path around the filter 312 and amplifier 314, respectively, allowing the filter 312 and/or amplifier 314 to be disabled, such as by being turned off, or otherwise bypassed. Reconfiguration of the circuit 300 may also be supported by switches 336 and 338 in the transceiver 320. The switches 336 and 338 may be toggled to redirect the receive path for an RF input signal through the amplifier 322 or around the amplifier 322. By controlling one or both of the switches 336 and 338, the switches 336 and/or 338 may be configured to toggle, at least in part, the receiver between an amplifier-first configuration and a mixer-first configuration. In a mixer-first configuration, the switch 336 may be toggled on and the switch 338 may be toggled off, such that an RF input signal received at the transceiver 320 is passed to the mixer 324 without first being amplified within the transceiver 320. In some embodiments, the amplifier 314 may be disabled and the switch 334 may be toggled on to remove all amplifiers of the RF signal in circuit 300 prior to processing at the mixer 324. In an amplifier-first configuration, the switch 336 is toggled off and the switch 338 is toggled on to direct the RF signal through the LNA 322 prior to processing in the mixer 324.

The configuration of the circuit 300 may be controlled by the detection circuit 328 and/or other circuitry or processing components. For example, the detection circuit 328 may have one or more control signals coupled to circuitry for reconfiguring the circuit 300, such as switches 332, 334, 336, and/or 338. The detection circuit 328 may be configured to detect predetermined criteria for switching between mixer-first and amplifier-first configurations. Example criteria include a signal-to-noise ratio (SNR) of the baseband signal, a threshold SNR level, detection of the presence of jammers, whether carrier aggregation (CA) is active where aggressor jammer signals are predictable as determined by certain evaluation criteria, and/or information from channel quality indicator (CQI) reports. In some embodiments, a single control signal output by the detection circuit 328 toggles the switches 332, 334, 336, and 338 between mixer-first and amplifier-first configurations. In some embodiments, several control signals may be output by the detection circuit 328 for the switches 332, 334, 336, and 338, which may allow the detection circuit 328 to toggle between more than two configurations for the circuit 300.

The criteria for the detection circuit 328 may be predetermined before reception of the RF input signal at the transceiver 320. For example, the detection circuit 328 may have one or more rules preprogrammed for evaluating one or more criteria of the signal. As another example, the detection circuit 328 may be configured with different criteria for evaluating the signal during operation of the circuit 300. In some embodiments, the detection circuit 328 may apply different criteria based on context, such as a location of the wireless device, an environment around the wireless device, and/or an operating mode of the wireless device. For example, when a SNR is above a certain threshold SNR value, the detection circuit 328 may switch the circuit 300 into a mixer-first configuration, such as by closing switch 336 and opening switches 334 and 338, to provide good SNR without the LNA power consumption in the transceiver 320. As another example, when the SNR is above a second threshold SNR value (which may, for example, be higher than the certain threshold SNR value), the detection circuit 328 may cause the switch 334 to close and disable the amplifier 314, such that the mixer-first configuration is extended into the RFFE 310 in the presence of a stronger RF input signal. When a transmission signal through the transmit path is off or less than a signal level threshold and the RF input signal is strong, the filter 312 can be bypassed by closing switch 332, which may avoid loss from the filter 312. As a further example, the presence of large jammer signals detected by the detection circuit 328 may cause the detection circuit 328 to configure the circuit 300 in a mixer-first configuration to provide high-linearity performance and reduce interruption from the jammer signals. In some embodiments, because of the high-linearity performance, this configuration may include a lower quality filter 312 in the RFFE 310 or omitting the filter 312 from the RFFE 310.

The detection circuit 328 may include logic circuitry for performing any of the determinations and/or controlling described herein. For example, the circuit 328 may include logic circuitry for determining whether criteria are met for switching to a mixer-first configuration for the receiver; determining whether second criteria are met for switching to an amplifier-first configuration for the receiver; configuring the RFFE and receiver to the mixer-first configuration, such as by operating switches 332, 334, 336, and/or 338; configuring the RFFE and receiver to the amplifier-first configuration, such as by operating switches 332, 334, 336, and/or 338; determining whether third criteria are met for reconfiguring the RFFE; determining gain values desired for processing paths of the receiver; determining whether the RF input signal comprises a carrier aggregation (CA) signal; and/or configuring gain-control elements to obtain desired gain values by generating control signals. The logic circuitry may control other elements illustrated in the embodiments disclosed herein, including switches, gain-control elements, filters, amplifiers, LNAs, mixers, and/or baseband processing circuitry.

Figure 4:
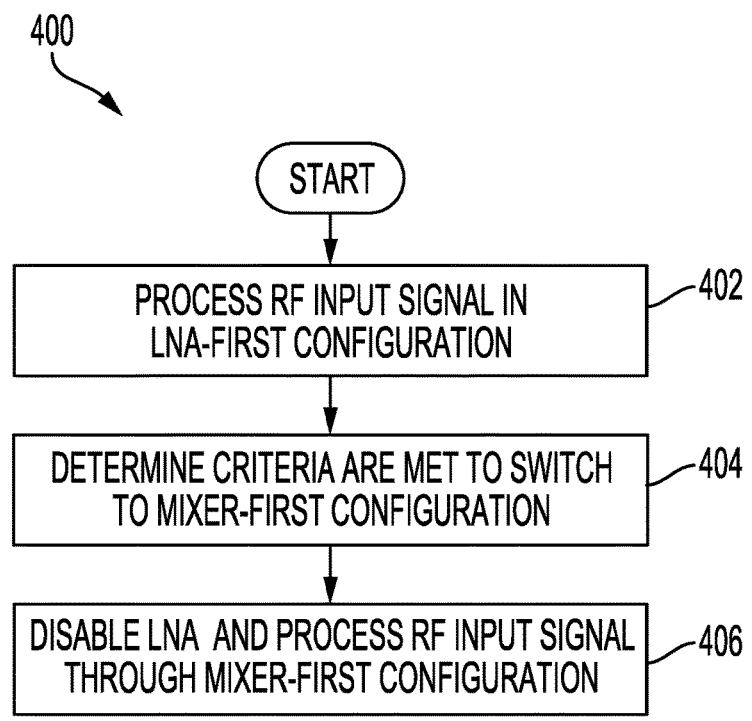
FIG. 4 is a flow chart illustrating a method for operating a receiver circuit with a reconfigurable capability for switching between mixer-first and amplifier-first according to one or more aspects.

A method for reconfiguring an RF circuit is described with reference to FIG. 4. FIG. 4 is a flow chart illustrating a method for operating a receiver circuit with a reconfigurable capability for switching between mixer-first and amplifier-first according to one or more aspects. A method 400 may begin at block 402 with processing an RF input signal in an LNA-first configuration. The RF input signal may include one or more of 2G, 3G, 4G, 5G sub-7 GHz, or 5G mmWave RF signals. The processing of the RF input signal may default to an amplifier-first configuration until certain criteria are met to switch to another configuration. The amplifier-first processing of block 402 may be reached through other manners than by a default configuration, such as by detection of certain criteria for using an amplifier-first configuration. The processing of block 402 may include filtering, amplifying, and/or downconversion to an intermediate frequency (IF) signal and/or baseband (BB) signal. In some examples, a mmWave RF signal is received at the antenna 302 and is downconverted to an IF signal in the RFFE 310, and the IF signal is processed in an amplifier-first configuration in the transceiver 320 pursuant to the processing of block 402. The output of the processing of block 402 may include a baseband signal that may be processed through digital logic circuitry to produce a data stream that includes the transmitted user data along and/or control data. The user data may be extracted from the data stream and processed to display as content to the user of the wireless device, such as by displaying an image received over a wireless network and/or displaying a video received over a wireless network.

The method 400 may include, at block 404, determining criteria are met to switch to a mixer-first configuration. The determination may include determining whether a signal has a signal-to-noise ratio (SNR) that crosses a certain threshold value. The determination may also or alternatively include determining the presence of a jammer signal interfering with the desired signal and/or determining the presence of a jammer signal that may potentially interfere with the desired signal and/or determining whether channel conditions indicated in a channel quality indicator (CQI) report cross certain threshold values.

At block 406, an LNA may be disabled and the RF input signal processed through a mixer-first configuration. This may include receiving a mmWave RF signal at the antenna 302, downconverting to an IF signal in the RFFE 310, and processing the IF signal in a mixer-first configuration in the transceiver 320 When criteria are met that suggest a mixer-first configuration may provide improved signal processing for the RF input signal, the circuit may be configured to have a receive path that processes the RF input signal in a transceiver by passing the signal directly to the mixer without amplification inside the receiver (e.g., inside the transceiver or inside both the RFFE and the transceiver). For example, switches may be toggled to change a receive path to bypass one or more amplifiers prior to a downconversion mixer. Components that are bypassed in the receive path in the new configuration of block 406 may be disabled to reduce power consumption. In some embodiments, gain control may be performed within the mixer-first configuration with gain control elements coupled in the processing path prior to the mixer. The processing of the RF input signal at block 406 may include adjusting one or more gain control elements in the mixer-first configuration processing path.

The configuration of block 406 may be maintained until signal changes cause the criteria of block 404 to no longer be satisfied, until signal changes cause a second set of criteria to be satisfied, and/or until a predetermined time period expires. For example, the method 400 may further include determining whether second criteria are met for switching to an amplifier-first configuration for the receiver and, when the second criteria are met: configuring the receiver to the amplifier-first configuration in which a second mixer is a dummy mixer; and return to processing the RF input signal in the receiver in the amplifier-first configuration through the first mixer at block 402. The mixer topology of a single-balanced mixer with a dummy mixer is considered in this example. In some examples, the mixer used to process the RF input signal in the mixer-first configuration is configured as a dummy mixer in the amplifier-first configuration. The receiver may continue to be reconfigured between amplifier-first and mixer-first configuration during operation of a wireless device based on assigned carrier configuration in the wireless network, available communication technologies in the wireless network, and/or conditions on channels in the wireless network.

In some embodiments, the processing of blocks 402 and 406 may be performed in parallel by processing at least portions of the RF input signal through the amplifier-first configuration and the mixer-first configuration. For example, when the RF input signal is determined to include a carrier aggregation (CA) signal, the method may include processing at least a first carrier of the CA signal in the amplifier-first configuration; and processing at least a second carrier of the CA signal in the mixer-first configuration.

In some embodiments, the receiver may be configured with a single-balanced mixer with a dummy mixer. When such a mixer design is present, the dummy mixer may be reconfigured between amplifier-first and mixer-first configurations to operate as a main mixer and the corresponding main mixer reconfigured to operate as a dummy mixer. The use of a dummy mixer in this configuration may separate degeneration resistor (RRF) functionality between the LNA-first and mixer-first configurations. As a result, the amplifier-first configuration can take advantage of an optimal value of RRF for its linearity, and the mixer-first configuration can achieve a good input impedance matching through a tunable mixer-first input switch and a gain-control element dedicated to the configuration. The flow chart of FIG. 5 and example circuits of FIG. 6A and FIG. 6B demonstrate embodiments of reconfiguration involving a dummy mixer.

Figure 5:
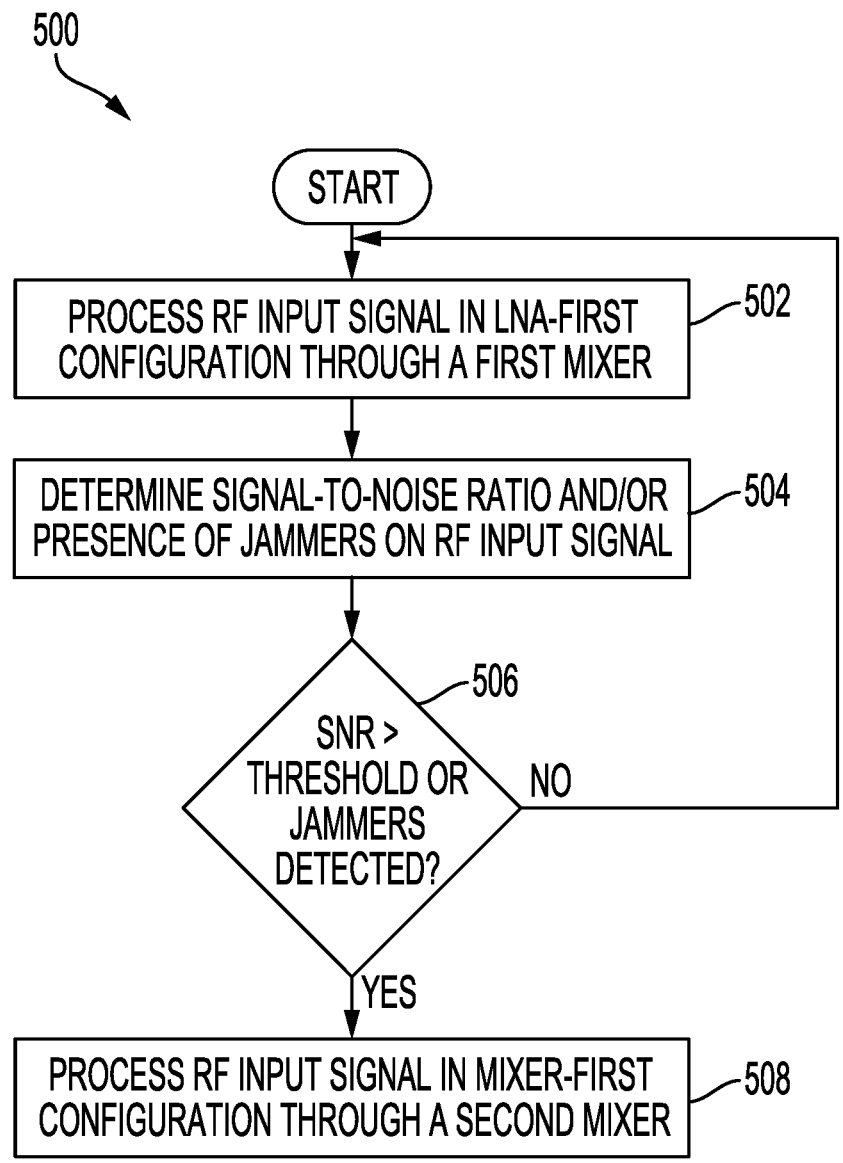
FIG. 5 is a flow chart illustrating a method for operating a receiver circuit with a reconfigurable capability that uses dummy mixers when configured in a mixer-first configuration according to one or more aspects.

FIG. 5 is a flow chart illustrating a method for operating a receiver circuit with a reconfigurable capability that uses dummy mixers when configured in a mixer-first configuration according to one or more aspects. A method 500 may begin at block 502 with processing an RF input signal in an amplifier-first configuration through a first mixer. The first mixer may be referred to as a main mixer and be coupled to a dummy mixer that is not active in processing the RF input signals when in the amplifier-first configuration. At block 504, criteria, such as a SNR value of the RF input signal or the presence of jammers on the RF input signal, may be determined. At block 506, it is determined whether the criteria are met, such as whether the SNR crosses a threshold value or whether jammers are detected in the RF input signal. If the criteria are not met, the method 500 continues to process the RF input signal in an amplifier-first configuration at block 502. If the criteria are met at block 506, then the method 500 continues to block 508 to reconfigure and process the RF input signal in a mixer-first configuration through a second mixer, such as a mixer that is a dummy mixer while processing in the amplifier-first configuration of block 502. In the mixer-first configuration of block 508, the mixer that is a dummy mixer in the amplifier-first configuration of block 502 is reconfigured as a main mixer and the main mixer in the amplifier-first configuration of block 502 is reconfigured as a dummy mixer. Reconfiguration of the mixers as main or dummy mixers may involve changing which of the two coupled mixers receives the RF input signal and/or whether an output is further processed by baseband circuitry. Baseband processing circuitry may be configured to perform further processing on an output of the mixer that is currently configured as the main mixer in either block 502 or block 508.

Figure 6A:
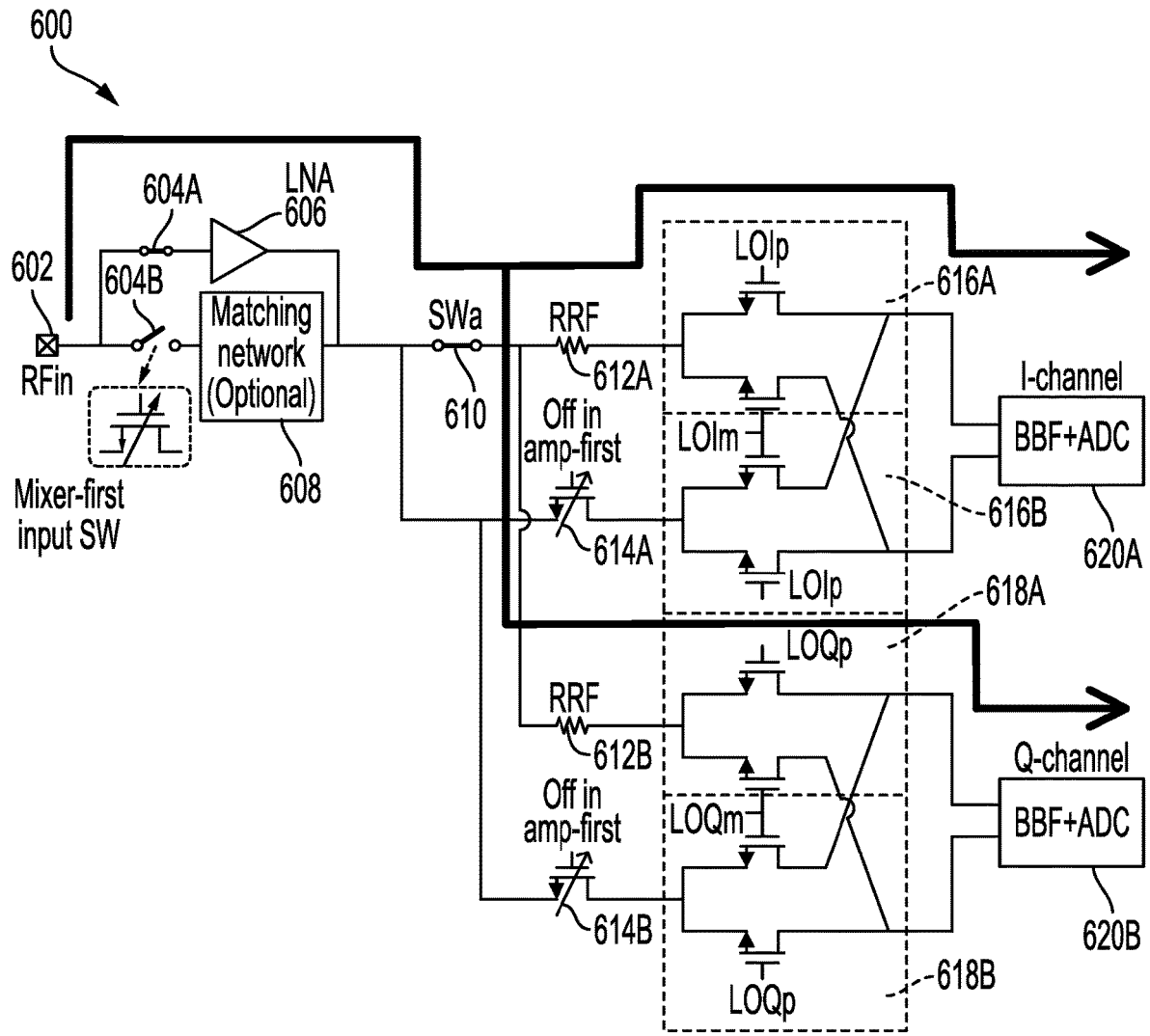
FIG. 6A is a circuit schematic illustrating a single-balanced mixer with a dummy mixer configured in an amplifier-first configuration according to one or more aspects.
Figure 6B:
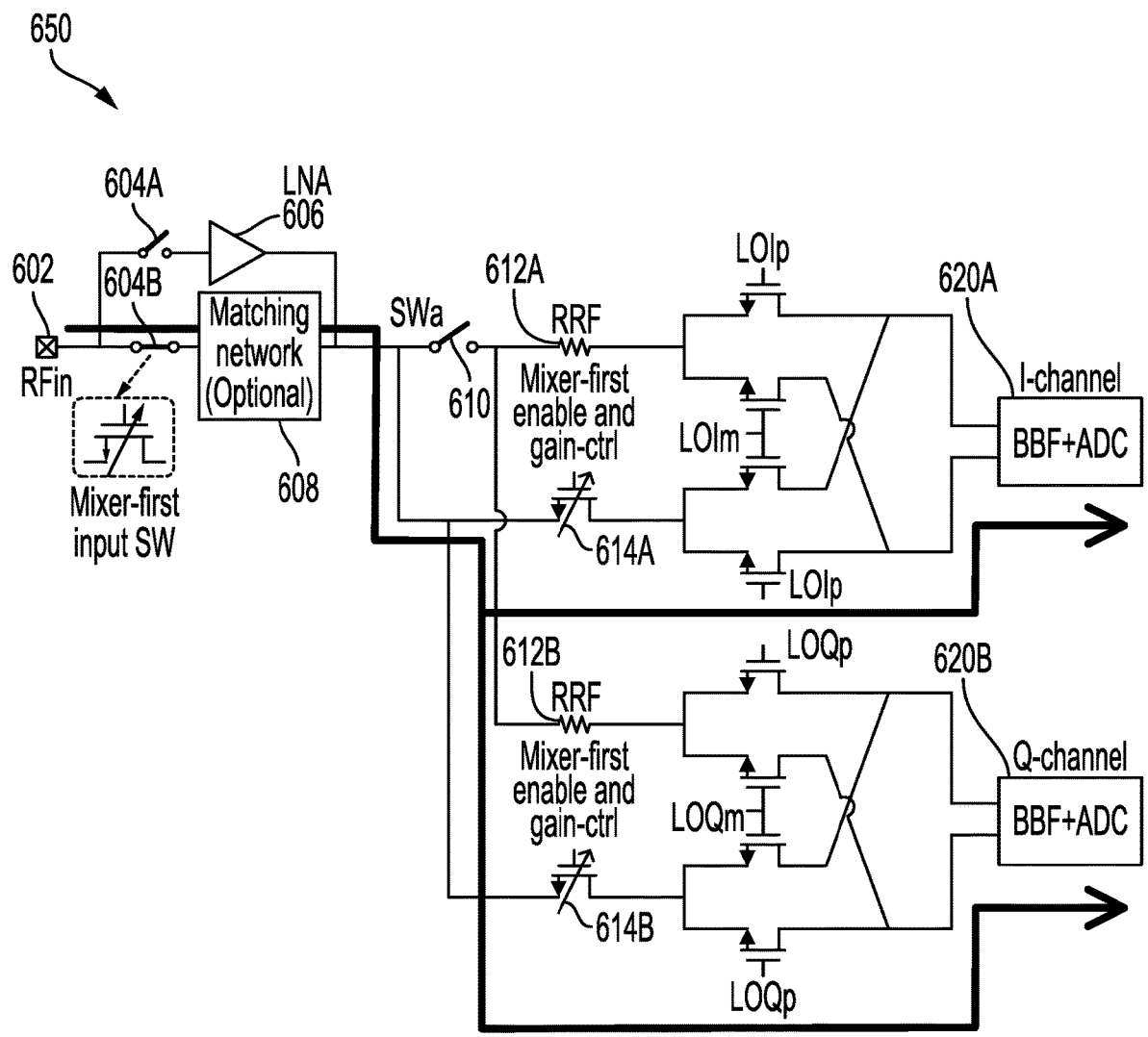
FIG. 6B is a circuit schematic illustrating a single-balanced mixer with a dummy mixer configured in a mixer-first configuration according to one or more aspects.

Example circuitry for reconfiguring first and second mixers between main and dummy mixers for amplifier-first and mixer-first configurations is shown in FIG. 6A and FIG. 6B. FIG. 6A is a circuit schematic illustrating a single-balanced mixer with a dummy mixer configured in an amplifier-first configuration according to one or more aspects. A circuit 600 receives an RF input signal at input port 602, such as from an RFFE (e.g., the RFFE 310). The RF input signal is controlled by switches 604A and 604B to pass through amplifier (e.g., LNA) 606 or matching network 608. The matching network 608 may be an optional component in the mixer-first configuration. In some aspects, the input impedance matching in the mixer-first configuration may be achieved by a tunable mixer-first input switch 604B and/or gain-control elements 614 (which may be implemented with transistors that may be adjustable). In some examples, the matching network 608 is disposed between the input port 602 and the switches 604A, 604B. The output of amplifier 606 and/or matching network 608 is controlled by a switch 610 and/or gain control transistors 614A and 614B to proceed through either a first set of mixers 616A and 618A or a second set of mixers 616B and 618B corresponding to I- and Q-channels, respectively. The switches 604A, 604B may be configured to toggle, at least in part, the receiver between an amplifier-first configuration and a mixer-first configuration, such as from appropriate control signals applied to the gates of transistors corresponding to the switches 604A and 604B. The output of either mixers 616A or 616B is further processed in baseband circuitry 620A. The output of either mixers 618A or 618B is further processed in baseband circuitry 620B. Both mixers 616A and 616B receive two LO (I) signals, for example having opposite phase. Similarly, both mixers 618A and 618B receive two LO (Q) signals, for example having opposite phase. The LO signals received by the mixer 616A may be the same LO signals as received by the mixer 616B. Similarly, the LO signals received by the mixer 618A may be the same LO signals as received by the mixer 618B. A first path of the circuit 600 may include the resistors 612 and the mixers 616A, 618A, and in some examples the amplifier 606. A second path of the circuit 600 may include the transistors 614 and the mixers 616B, 618B, and the matching network 608 and/or the switch 604B in some examples. As alluded to above, the term RF input signal in this description may include signals derived from a mmWave signal received at an antenna. For example, RF input signals may include signals having an IF frequency, for example that were downconverted from a frequency at which mmWave RF signals were received at an antenna. A component described as being configured to process RF input signals may therefore be configured to process such signals at a frequency other than the frequency at which signals were received at the antenna.

In an amplifier-first configuration, the switches 604A and 604B and 610 are configured as shown in circuit 600 of FIG. 6A. The switch 604A is toggled on (e.g., in a closed state when the switch is binary), the switch 604B is toggled off, and the switch 610 is toggled on (e.g., closed). The RF input signal from input port 602 passes through amplifier 606 to mixer degeneration resistors (RRF) 612A and 612B, to first mixers 616A and 618A, and to baseband processing circuitry 620A and 620B. The transistors 614A and 614B may be switched off so that the RF input signal is effectively disconnected from the second mixers 616B and 618B and the second mixers 616B and 618B are used as dummy mixers. In some embodiments, the circuit 600 may be configured for amplifier-first operation when processing 5G mmWave RF input signals because mmWave signals undergo large signal loss and they need amplification.

In a mixer-first configuration, the switches 604A-B and 610 are configured as shown in circuit 650 of FIG. 6B. FIG. 6B is a circuit schematic illustrating a single-balanced mixer with a dummy mixer configured in a mixer-first configuration according to one or more aspects. The switch 604A is toggled off, the switch 604B is toggled on, and the switch 610 is toggled off. The mixers 616A and 618A used in the amplifier-first configuration are degenerated by the resistors RRF 612A and 612B to improve the linearity of the amplifier configuration, but the typical values of RRF may not provide a good input impedance matching in the mixer-first configuration. Thus, the RF input signal may be routed to mixers 616B and 618B through the mixer-first gain-control transistors 614A and 614B in the mixer-first configuration. In the mixer-first configuration, mixers 616B and 618B are main mixers while the mixers 616A and 618A are dummy mixers. With the use of a dummy mixer in this configuration, a good input impedance matching can be achieved by using tunable mixer input switch 604B and gain-control element 614A. The switching of the main mixer and dummy mixer allow reconfiguration of the receiver without negatively affecting the performance of each configuration. The RF input signal from input port 602 passes through an optional matching network 608, to gain-control transistors 614A and 614B to second mixers 616B and 618B, and to baseband processing circuitry 620A and 620B. The transistors 614A and 614B may be used to adjust gain to adjust a signal strength of the RF input signal before processing in the mixers 616B and 618B. For example, a source (e.g., input) of each of the transistors 614A, 614B may be selectively coupled to the input port 602, a drain (e.g., output) of each of the transistors 614A, 614B may be coupled to the baseband processing circuitry 620A, 620B, and the gates of the transistors 614A, 614B may be coupled to a control signal, for example provided by the detection circuit 328 so as to adjust transistors 614A, 614B. Opening the switch 610 results in the RF input signal not processing through the first mixers 616A and 618B, which reconfigures the first mixers 616A and 618A as dummy mixers in the mixer-first configuration from main mixers in the amplifier-first configuration of FIG. 6A. The second mixers 616B and 618B are reconfigured as main mixers in the mixer-first configuration from dummy mixers in the amplifier-first configuration of FIG. 6A. In some embodiments, a receiver may be configured in mixer-first configuration as in circuit 650 when processing 5G sub-7 GHz RF input signals.

Figure 7:
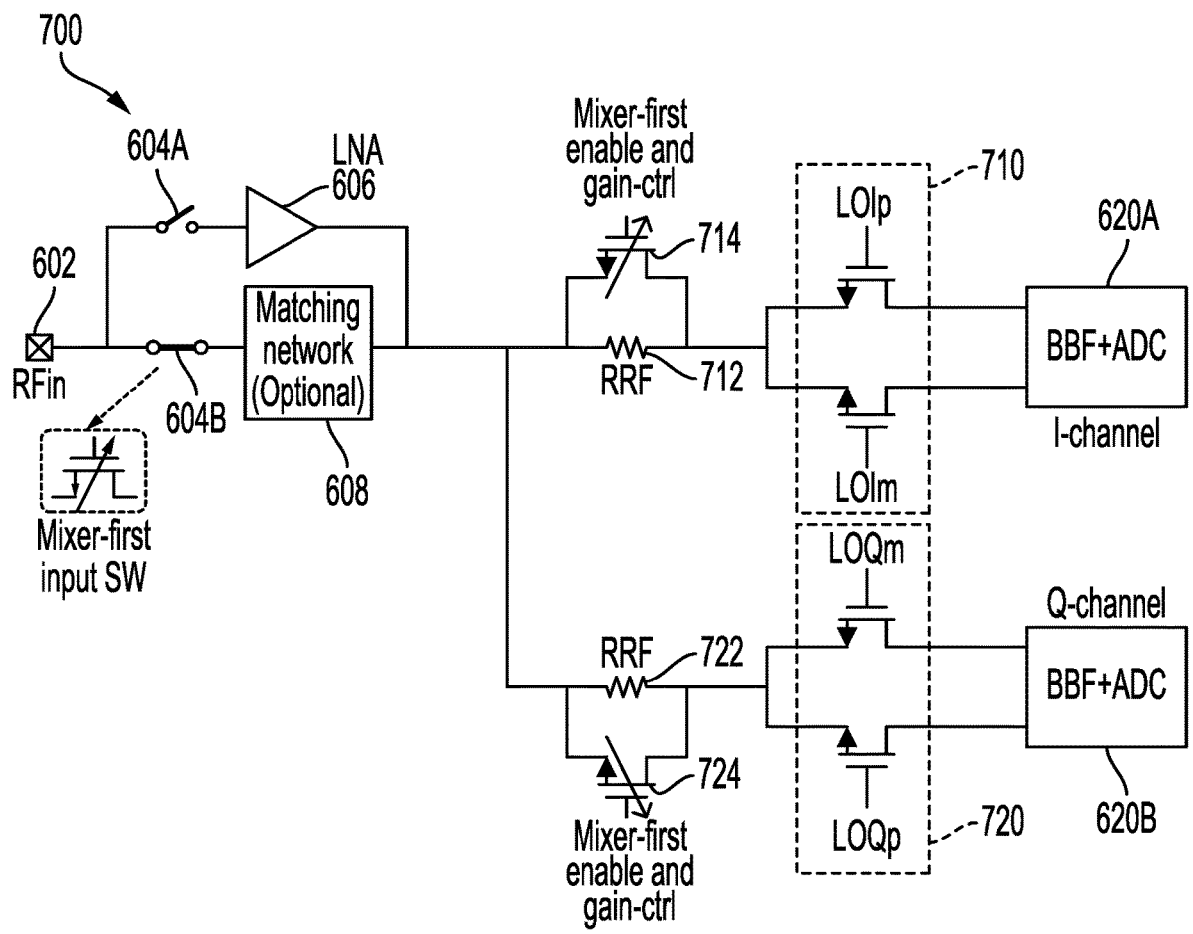
FIG. 7 is a circuit schematic illustrating a receiver circuit with a reconfigurable capability with a mixer-first gain control switch in parallel with a mixer degeneration resistor according to one or more aspects.

Another embodiment of a circuit for reconfiguration between mixer-first and amplifier-first configuration is shown in FIG. 7. FIG. 7 is a circuit schematic illustrating a receiver circuit with a reconfigurable capability with mixer-first gain control switches in parallel with mixer degeneration resistors (RRF) according to one or more aspects. Circuit 700 may receive the RF input signal at input port 602 through either amplifier 606 or an optional matching network 608 via switches 604A or 604B. The output of amplifier 606 or matching network 608 is provided to two baseband processing circuitries 620A and 620B. In this embodiment, a mixer-first gain control switch 714 is coupled in parallel with a mixer degeneration resistor (RRF) 712. In mixer-first configuration, the mixer-first gain-control switches 714 and 724 are toggled on such that the degeneration resistor RRF may be bypassed because the on-resistance of mixer-first gain-control switches 714 and 724 may be smaller than the RRF. For the amplifier-first configuration, the switch 604A is toggled on and the switches 604B, 714, and 724 are toggled off. This configuration is appropriate when a single-balanced mixer with RRF but without a dummy mixer is appropriate according to criteria of the RF input signal and other operating conditions. The scheme can also be used for a double-balanced mixer with RRF. In some embodiments, the gain control switches 714 and 724 may also provide input matching with the mixer-first input switch 604B when operating in the mixer-first configuration.

Figure 8:
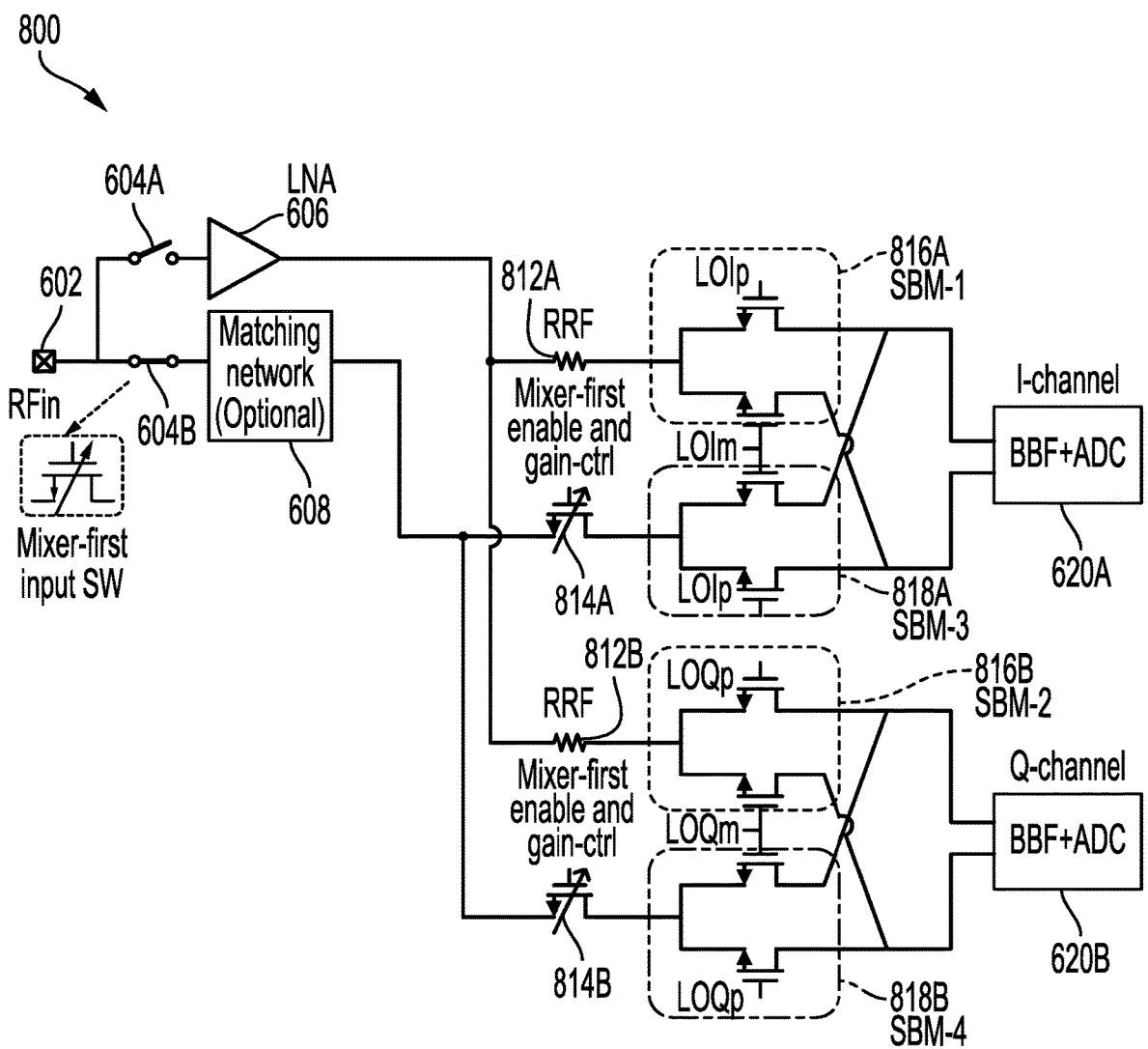
FIG. 8 is a circuit schematic illustrating a single-balanced mixer used with or without a dummy mixer that is reconfigurable between mixer-first and amplifier-first according to one or more aspects.

In some embodiments, when a single-balanced mixer (SBM) is used, a switch between the amplifier and mixer, such as switch 610 of FIG. 6A, can be removed, as illustrated in FIG. 8. FIG. 8 is a circuit schematic illustrating a single-balanced mixer that is reconfigurable between mixer-first and amplifier-first according to one or more aspects. A circuit 800 includes a first processing path coupled from the LNA 606 to mixer degeneration resistors 812A and 812B, to single balanced mixers (SBMs) 816A and 816B, and to downstream baseband processing circuitry 620A and 620B. The circuit 800 includes a second processing path coupled from the optional matching network 608 to mixer-first gain-control switches 814A and 814B, to SBMs 818A and 818B, and to downstream baseband processing circuitry 620A and 620B. The switches 604A and 604B are toggled to configure the circuit 800 for amplifier-first configuration or mixer-first configuration. When switch 604A is toggled on and switch 604B toggled off, the circuit 800 operates in amplifier-first configuration by routing the RF input signal received at input port 602 to the LNA 606 and then to the baseband processing circuitry 620A and 620B. When switch 604A is toggled off and switch 604B is toggled on, the circuit 800 operates in mixer-first configuration by routing the RF input signal to the baseband processing circuitry 620A and 620B without amplification through the LNA 606.

In amplifier-first configuration, SBMs 816A and 816B are operating while SBMs 818A and 818B may be configured as dummy mixers or be turned off. In mixer-first configuration, SBMs 818A and 818B are operating while SBMs 816A and 816B may be configured as dummy mixers or be turned off. In contrast to FIG. 6 where there is a common portion in the first path and the second path at the output of the amplifier 606, the first path and second path in FIG. 8 are separate prior to the mixers (e.g., prior to the resistors 612 and the transistors 614).

Figure 9:
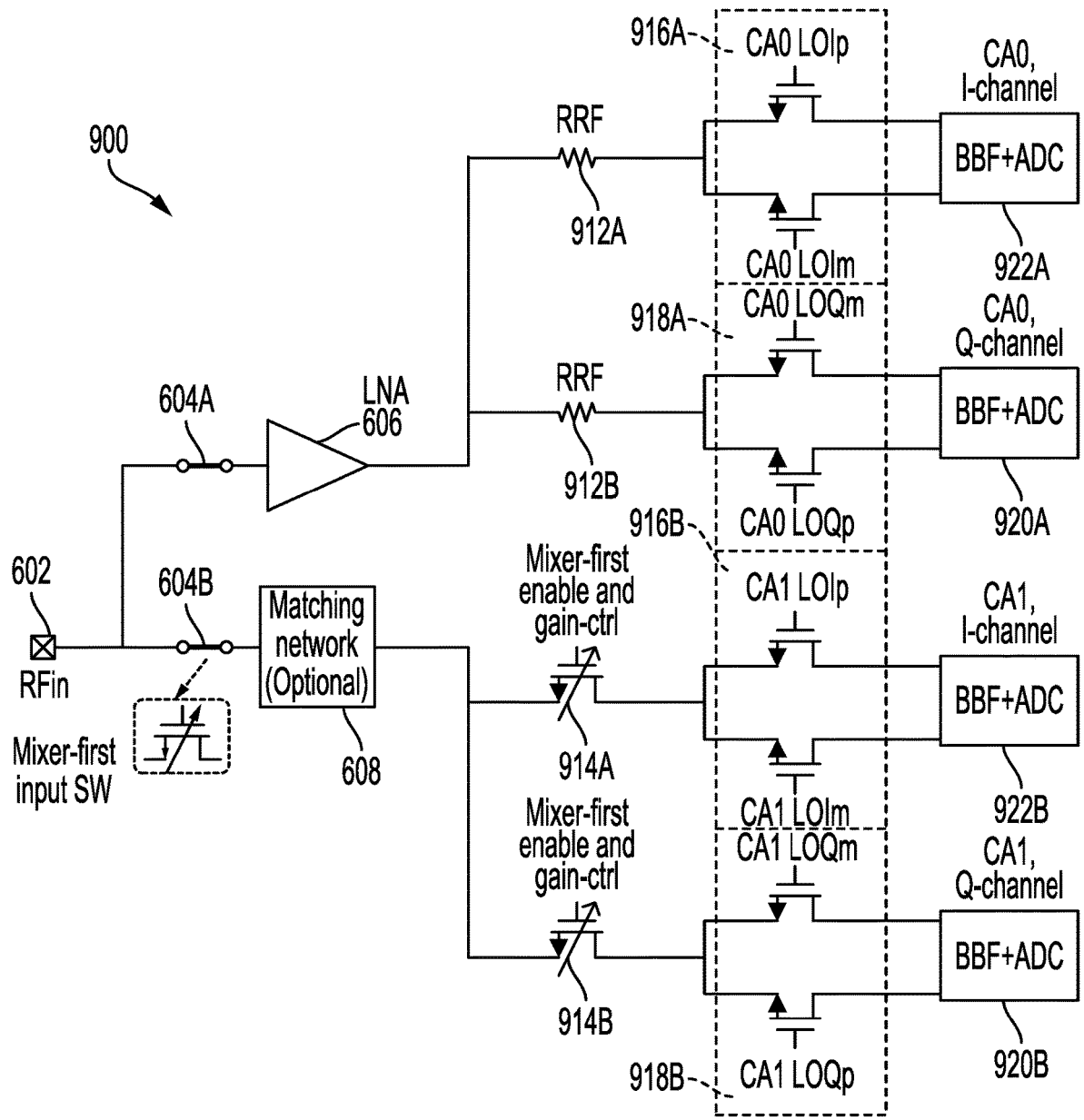
FIG. 9 is a circuit schematic illustrating processing carrier aggregation (CA) RF signals through a receiver that is reconfigurable between mixer-first and amplifier-first according to one or more aspects.

When multiple, wholly separate processing paths are available for the mixer-first and amplifier-first configurations in a receiver, the processing paths may be used in parallel to process different signals simultaneously. One application for parallel processing of RF signals is for processing carrier aggregation (CA) RF signals, in which related information is embedded on multiple signals at different carriers. FIG. 9 is a circuit schematic illustrating a configuration for processing carrier aggregation (CA) RF input signals through a receiver that is reconfigurable between mixer-first and amplifier-first according to one or more aspects. In circuit 900, a first processing path for amplifier-first processing of an RF input signal through the LNA 606 sends the amplified RF signals through mixer degeneration resistors 912A and 912B and SBMs 916A and 918A to baseband processing circuits 922A and 920A. A second processing path for mixer-first processing of an RF input signal through the optional matching network 608 sends signals through gain control elements 914A and 914B and SBMs 916B and 918B to baseband processing circuits 922B and 920B. The SBMs 916A, 918A may receive LO signals which are different (e.g., at a different frequency) from the LO signals received by the SBMs 916B, 918B. Switches 604A and 604B may toggle on and off the first and second processing paths to configure the receiver for amplifier-first or mixer-first processing of the RF input signal. The switches 604A and 604B may both be switched on to operate both processing paths in parallel. For example, logic circuitry (e.g., the detection circuit 328 or other circuitry) coupled to the switches 604A and 604B may determine that the RF input signal includes a CA signal, by monitoring the RF input signal and/or receiving commands from the network to switch to CA operation. The logic circuitry may close the switches 604A and 604B to route the RF input signal received at input port 602 through both processing paths. The circuit 900 may process at least one carrier in the CA signal through each of the processing paths. The processing paths may be configured for processing a particular carrier or carriers in the CA signal. For example, when CA operation involves 5G mmWave and 5G sub-7 GHz signals, the SBMs 916A and 918A may be configured for processing one or more carriers for 5G mmWave communication and the SBMs 916B and 918B may be configured for processing one or more carriers for 5G sub-7 GHz communication.

Figure 10:
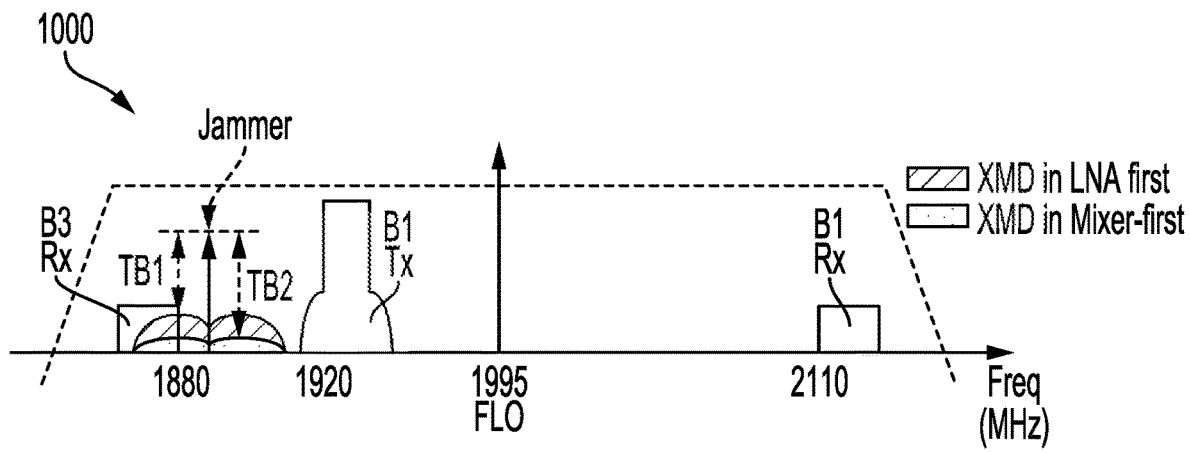
FIG. 10 is a graph illustrating an example RF signal with B1+B3 RF signals that may be beneficially processed according to one or more aspects.
Figure 11:
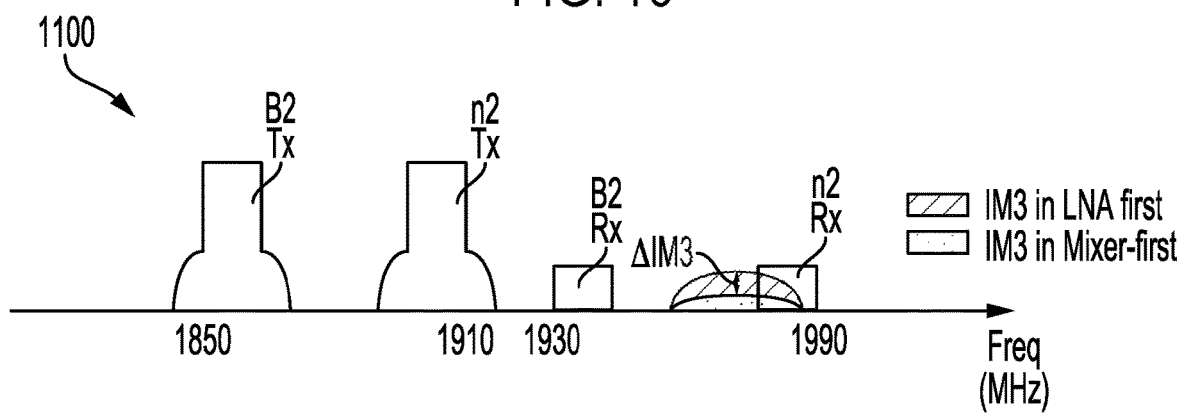
FIG. 11 is a graph illustrating an example RF signal with B2+n2 RF signals that may be beneficially processed according to one or more aspects.
Figure 12:
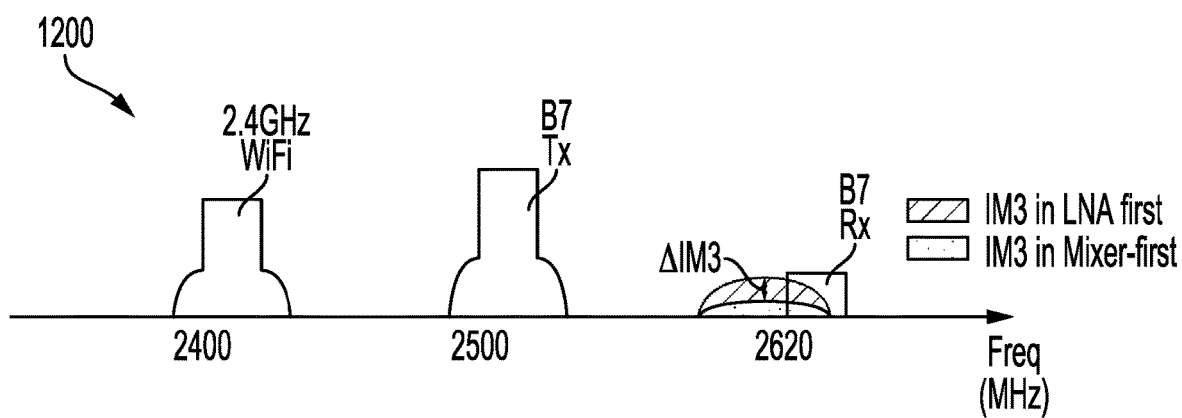
FIG. 12 is a graph illustrating an example RF signal with 2.4 GHz WiFi coexistence that may be beneficially processed according to one or more aspects.

Illustrative examples demonstrating the benefits of a receiver that can be reconfigured between mixer-first and amplifier-first configurations are shown in FIG. 10, FIG. 11, and FIG. 12. FIG. 10 is a graph illustrating an example RF signal with B1+B3 RF signals that may be beneficially processed according to one or more aspects. The frequency diagram 1000 illustrates CA receive operation on bands B1+B3. A jammer and B1 transmission leakage may create cross-modulation distortion (XMD) at an LNA resulting in loss of the B3 receive signal. When operating on these bands, reconfiguring a receiver to switch from amplifier-first to mixer-first configuration can improve the likelihood of recovering information from the B3 signal. According to one simulation, for amplifier-first mode the TB-IIP3 (TB1) is 10 dBm, but for mixer-first mode the TB-IIP3 (TB2) is 23 dBm. FIG. 11 is a graph illustrating an example RF signal with B2+n2 RF signals that may be beneficially processed according to one or more aspects. The frequency diagram 1100 illustrates CA receive operation on bands B2+n2. B2 operation and n2 transmission leakage may create a IM3 non-linearity in an LNA in the receiver resulting in loss of the n2 receive signal. According to one simulation, for amplifier-first mode the IIP3 is 8 dBm, but for mixer-first mode the IIP3 is 20 dBm, for example due to a reduction in the IM3 non-linearity ($\Delta$IM3). FIG. 12 is a graph illustrating an example RF signal with 2.4 GHz WiFi coexistence that may be beneficially processed according to one or more aspects. The frequency diagram 1200 illustrates operation of a wireless device on band B7 with 2.4 GHz WiFi coexistence. The WiFi jammer signal and B7 transmission leakage may create an IM3 non-linearity at an LNA of the receiver resulting in loss of the B7 receive signal. According to one simulation, for amplifier-first mode IIP3 is 8 dBm, but for mixer-first mode the IIP3 is 20 dBm, for example due to a reduction in the IM3 non-linearity ($\Delta$IM3). The mixer-first configuration may avoid WiFi signal back-off that occurs due to the coexistence in amplifier-first configuration. Each of these examples illustrated operations where mixer-first configurations resulted in better receipt of signals and likelihood of extracting correct data embedded in those signals. Thus, the flexibility to switch a receiver between amplifier-first and mixer-first configurations can improve operation of the receive and the user experience of the wireless device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1, FIG. 2, and FIG. 3 include some or all of processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

In one or more aspects, techniques for supporting wireless communication by processing radio frequency (RF) signals may include additional aspects, such as any single aspect or any combination of aspects described below or in connection with one or more other processes or devices described elsewhere herein. In one or more aspects, supporting wireless operations may include an apparatus having a configurable wireless processing path. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus, such as described in FIG. 4 or FIG. 5. In some other implementations, the apparatus may include a non-transitory computer-readable medium having program code recorded thereon and the program code may be executable by a computer for causing the computer to perform operations described herein with reference to the apparatus.

In some implementations, the apparatus may include one or more means configured to perform operations described herein. In some implementations, a method of wireless communication may include one or more operations described herein with reference to the apparatus.

In a first aspect, a method for operating a wireless device may include processing an RF input signal in a receiver in an amplifier-first configuration through a first mixer; determining whether criteria are met for switching to a mixer-first configuration for the receiver; when the determining results in determining the criteria are met: configuring the receiver to the mixer-first configuration, and/or processing the RF input signal in the receiver in the mixer-first configuration through a second mixer.

In a second aspect, in combination with the first aspect, the step of determining whether criteria are met for switching to the mixer-first configuration comprises determining whether a signal-to-noise ratio (SNR) is above a threshold value.

In a third aspect, in combination with one or more of the first aspect through the second aspect, the step of determining whether criteria are met for switching to the mixer-first configuration comprises determining whether jammer signals with a signal strength above a threshold value are detected in the RF input signal.

In a fourth aspect, in combination with one or more of the first aspect through the third aspect, the step of configuring the receiver to the mixer-first configuration comprises configuring the first mixer as a dummy mixer.

In a fifth aspect, in combination with one or more of the first aspect through the fourth aspect, after configuring the receiver to the mixer-first configuration the method may include determining whether second criteria are met for switching to an amplifier-first configuration for the receiver; and when determining results in the second criteria are met: configuring the receiver to the amplifier-first configuration in which the second mixer is a dummy mixer and/or processing the RF input signal in the receiver in the amplifier-first configuration through the first mixer.

In a sixth aspect, in combination with one or more of the first aspect through the fifth aspect, configuring the receiver to the mixer-first configuration comprises bypassing an amplifier of the receiver.

In a seventh aspect, in combination with one or more of the first aspect through the sixth aspect, processing the RF input signal in the receiver in the mixer-first configuration comprises adjusting a gain control element before downconverting the RF input signal in the second mixer.

In an eighth aspect, in combination with one or more of the first aspect through the seventh aspect, configuring the receiver to the mixer-first configuration comprises toggling a switch to configure a processing path for the RF input signal through the gain control element and the second mixer.

In a ninth aspect, in combination with one or more of the first aspect through the eighth aspect, adjusting the gain control element comprises adjusting a gain control element coupled in parallel with a degeneration resistor.

In a tenth aspect, in combination with one or more of the first aspect through the ninth aspect, processing the RF input signal through the first mixer comprises processing the RF input signal through a first single balanced mixer (SBM); and/or processing the RF input signal through the second mixer comprises processing the RF input signal through a second single balanced mixer (SBM).

In an eleventh aspect, in combination with one or more of the first aspect through the tenth aspect, the method includes determining whether the RF input signal comprises a carrier aggregation (CA) signal; based on one or more criteria comprising at least that the RF input signal comprises a CA signal: processing at least a first carrier of the CA signal in the amplifier-first configuration through the first mixer and/or processing at least a second carrier of the CA signal in the mixer-first configuration through the second mixer.

In a twelfth aspect, in combination with one or more of the first aspect through the eleventh aspect, the processing at least a first carrier of the CA signal comprises processing a 5G mmWave RF signal through the first mixer; and/or the processing at least a second carrier of the CA signal comprises processing a 5G sub-7 GHz RF signal through the second mixer.

In a thirteenth aspect, in combination with one or more of the first aspect through the twelfth aspect, the method includes determining whether second criteria are met while processing the RF input signal in the receiver in the mixer-first configuration through the second mixer; and when the determining results in determining the second criteria are met, configuring a radio frequency front end (RFFE) to bypass a low noise amplifier (LNA) of the RFFE.

In a fourteenth aspect, in combination with one or more of the first aspect through the thirteenth aspect, determining whether second criteria are met comprises: determining a transmit signal strength of a transmit signal through the RFFE is below a first threshold; and/or determining a receive signal strength of the RF input signal through the RFFE is above a second threshold.

In a fifteenth aspect, in combination with one or more of the first aspect through the fourteenth aspect, the step of configuring the receiver to the mixer-first configuration comprises closing a switch to couple the RF input signal through a matching network to the second mixer.

In a sixteenth aspect, in combination with one or more of the first aspect through the fifteenth aspect, the step of configuring the receiver to the mixer-first configuration comprises configuring an impedance of a switch coupling the RF input signal to the second mixer.

In a seventeenth aspect, alone or in combination with one or more of the first aspect through the sixteenth aspect, an apparatus having a configurable wireless processing path may include a receive port for receiving an RF input signal; a first mixer coupled to the receive port; a second mixer coupled to the receive port; a low noise amplifier (LNA) coupled between the receive port and the first mixer; and/or a switch coupled between the receive port and the LNA, wherein the switch is configured to toggle, at least in part, the receiver between an amplifier-first configuration and a mixer-first configuration.

In an eighteenth aspect, in combination with the seventeenth aspect, the apparatus includes a second switch coupled between the LNA and the first mixer, coupled between the LNA and the second mixer, and configured to toggle the first mixer from a main mixer to a dummy mixer.

In a nineteenth aspect, in combination with one of the seventeenth aspect through the eighteenth aspect, the apparatus includes logic circuitry configured to determine whether criteria are met for switching between the mixer-first configuration and the amplifier-first configuration; and to operate the switch based on whether the criteria are met.

In a twentieth aspect, in combination with one of the seventeenth aspect through the nineteenth aspect, the logic circuitry is configured to determine whether criteria are met by determining whether a signal-to-noise ratio (SNR) of the RF input signal is above a threshold value.

In a twenty-first aspect, in combination with one of the seventeenth aspect through the twentieth aspect, the logic circuitry is configured to determine whether criteria are met by determining whether jammer signals with a signal strength above a threshold value are detected in the RF input signal.

In a twenty-second aspect, in combination with one of the seventeenth aspect through the twenty-first aspect, the logic circuitry is further configured to determine whether second criteria are met for switching to an amplifier-first configuration for the receiver; and when the second criteria are met: to configure the receiver to the amplifier-first configuration and/or to process the RF input signal in the receiver in the amplifier-first configuration through the first mixer.

In a twenty-third aspect, in combination with one of the seventeenth aspect through the twenty-second aspect, the apparatus includes a radio frequency front end (RFFE) coupled to the receiver, wherein the RFFE comprises: a filter; and a low noise amplifier (LNA), wherein the logic circuitry is configured to control at least one of the filter or the LNA of the RFFE based on whether second criteria are met.

In a twenty-fourth aspect, in combination with one of the seventeenth aspect through the twenty-third aspect, the logic circuitry is configured to control the RFFE based on determining a transmit signal strength of a transmit signal through the RFFE is below a first threshold and determining a receive signal strength of the RF input signal through the RFFE is above a second threshold.

In a twenty-fifth aspect, in combination with one of the seventeenth aspect through the twenty-fourth aspect, the receiver comprises an integrated circuit (IC) separate from the RFFE.

In a twenty-sixth aspect, in combination with one of the seventeenth aspect through the twenty-fifth aspect, the switch is configured to switch between the mixer-first configuration and the amplifier-first configuration by bypassing the LNA.

In a twenty-seventh aspect, in combination with one of the seventeenth aspect through the twenty-sixth aspect, the apparatus includes a gain control element coupled to the second mixer and configured to adjust a gain of the RF input signal before downconverting the RF input signal in the second mixer.

In a twenty-eighth aspect, in combination with one of the seventeenth aspect through the twenty-seventh aspect, the apparatus includes a second switch coupled between the LNA and the first mixer, coupled between the LNA and the second mixer, and configured to configure a processing path for the RF input signal through the gain control element and the second mixer in a mixer-first configuration.

In a twenty-ninth aspect, in combination with one of the seventeenth aspect through the twenty-eighth aspect, the apparatus includes a degeneration resistor coupled in parallel with the gain control element.

In a thirtieth aspect, in combination with one of the seventeenth aspect through the twenty-ninth aspect, the first mixer comprises a single balanced mixer (SBM), and wherein the second mixer comprises a single balanced mixer (SBM).

In a thirty-first aspect, in combination with one of the seventeenth aspect through the thirtieth aspect, the switch is configured to activate a first processing path to the first mixer, the receiver further comprising a second switch coupled between the receive port and the second mixer, wherein the second switch is configured to activate a second processing path to the second mixer.

In a thirty-second aspect, in combination with one of the seventeenth aspect through the thirty-first aspect, the apparatus includes logic circuitry coupled to the switch and to the second switch, wherein the logic circuitry is configured to: determine whether an RF input signal comprises a carrier aggregation (CA) signal; and when the RF input signal comprises a CA signal: operate the switch to process at least a first carrier of the CA signal through the first processing path comprising the LNA and the first mixer and/or operate the second switch to process at least a second carrier of the CA signal through the second processing path comprising the second mixer.

In a thirty-third aspect, in combination with one of the seventeenth aspect through the thirty-second aspect, the apparatus includes a matching network coupled between the receive port and the second mixer, and/or a second switch coupled between the receive port and the matching network, wherein the second switch is configured to toggle, at least in part, the receiver between an amplifier-first configuration and a mixer-first configuration.

In a thirty-third aspect, in combination with one of the seventeenth aspect through the thirty-third aspect, the apparatus includes a second switch coupled between the receive port and the second mixer, wherein the receiver is configured to control an impedance of the second switch to match an input impedance of the second mixer when the receiver is configured in the mixer-first configuration.

In a thirty-fourth aspect, alone or in combination with one of the seventeenth aspect through the thirty-fourth aspect, the apparatus includes a receive port for receiving an RF input signal; a first set of mixers coupled to the receive port; a second set of mixers coupled to the receive port; means for configuring the first set of mixers as main mixers in a first mode, the second set of mixers as dummy mixers in the first mode, the first set of mixers as dummy mixers in a second mode, and the second set of mixers as main mixers in the second mode; and/or means for processing baseband signals coupled to outputs of the first set of mixers and to outputs of the second set of mixers.

In a thirty-fifth aspect, in combination with one of the seventeenth aspect through the thirty-fourth aspect, the first mode is an amplifier-first mode and the second mode is a mixer-first mode.

In a thirty-sixth aspect, in combination with one of the seventeenth aspect through the thirty-fifth aspect, the means for configuring comprise means for coupling only one of the first set of mixers and the second set of mixers to an RF input signal at a time.

In a thirty-seventh aspect, in combination with one of the seventeenth aspect through the thirty-sixth aspect, the first set of mixers are in a path coupled to an amplifier, and the second set of mixers are in a path comprising a plurality of gain-control elements.

In a thirty-eighth aspect, alone or in combination with one of the seventeenth aspect through the thirty-seventh aspect, the apparatus includes a receiver configured to receive a RF input signal; process the RF input signal to generate a baseband output signal corresponding to the RF input signal; and logic circuitry coupled to the receiver, wherein the logic circuitry is configured to: determine whether to process the RF input signal in a mixer-first configuration or to process the RF input signal in an amplifier-first configuration and/or configure the receiver in the mixer-first configuration or the amplifier-first configuration based on the determination.

In a thirty-ninth aspect, alone or in combination with one of the seventeenth aspect through the thirty-eighth aspect, the logic circuitry is configured to determine whether to process the RF input signal in a mixer-first configuration or to process the RF input signal in an amplifier-first configuration based on determining whether a signal-to-noise ratio (SNR) of the RF input signal is above a threshold value.

In a fortieth aspect, in combination with one of the seventeenth aspect through the thirty-ninth aspect, the logic circuitry is configured to determine whether to process the RF input signal in a mixer-first configuration or to process the RF input signal in an amplifier-first configuration based on determining whether jammer signals with a signal strength above a threshold value are detected in the RF input signal.

In a forty-first aspect, in combination with one of the seventeenth aspect through the fortieth aspect, the apparatus includes a radio frequency front end (RFFE) coupled to the receiver, the RFFE comprising: a filter; and a low noise amplifier (LNA), wherein the logic circuitry is configured to control at least one of the filter or the LNA of the RFFE based on whether second criteria are met.

In a forty-second aspect, in combination with one of the seventeenth aspect through the forty-first aspect, the logic circuitry is configured to control the RFFE based on determining a transmit signal strength of a transmit signal through the RFFE is below a first threshold and/or determining a receive signal strength of the RF input signal through the RFFE is above a second threshold.

In a forty-third aspect, alone or in combination with one of the seventeenth aspect through the forty-second aspect, a receiver includes an input port configured to receive an RF input signal; an amplifier coupled to the input port; a first path comprising resistors coupled between the amplifier and a first set of mixers; a second path comprising adjustable transistors coupled between the input port and a second set of mixers; and/or baseband processing circuitry coupled to one or both of the first set of mixers and the second set of mixers.

In a forty-fourth aspect, in combination with one of the seventeenth aspect through forty-third aspect, the baseband processing circuitry is coupled to both the first set of mixers and the second set of mixers, wherein the second path is coupled to the input port without a low noise amplifier therebetween, and wherein the receiver is configured to couple the input port to only one of the first path or the second path at a time.

In a forty-fifth aspect, in combination with one of the seventeenth aspect through forty-forth aspect, the baseband processing circuitry is coupled to the first set of mixers, the receiver further comprising second baseband processing circuitry coupled to the second set of mixers, wherein the second path is coupled to the input port without a low noise amplifier therebetween, and wherein the receiver is configured to couple the input port to one or both of the first path and the second path.

In a forty-sixth aspect, in combination with one of the seventeenth aspect through forty-fifth aspect, the first path and the second path share a common portion at an output of the amplifier.

In a forty-seventh aspect, in combination with one of the seventeenth aspect through forty-sixth aspect, the first path and the second path are separate prior to the first and second set of mixers.

In a forty-eighth aspect, in combination with one of the seventeenth aspect through forty-seventh aspect, the apparatus includes logic circuitry configured to determine whether criteria are met for switching between the mixer-first configuration and the amplifier-first configuration, and a radio frequency front end (RFFE) coupled to the receiver, wherein the RFFE comprises: a filter and a low noise amplifier (LNA), wherein the logic circuitry is configured to bypass at least one of the filter or the LNA of the RFFE based on the criteria.

In a forty-ninth aspect, in combination with the twenty-seventh aspect, the gain control element is configured to disconnect the RF input signal from the second mixer in the amplifier-first configuration.

In a fiftieth aspect, in combination with the seventeenth aspect, the first mixer and the second mixer are coupled to the LNA, and the apparatus includes a first configurable gain control element coupled to the first mixer and a second configurable gain control element coupled to the second mixer.

In a fifty-first aspect, in combination with the fiftieth aspect, the apparatus includes a first degeneration resistor coupled in parallel with the first configurable gain control element between the LNA and the first mixer, and a second degeneration resistor coupled in parallel with the second configurable gain control element between the LNA and the second mixer.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if an apparatus is described as containing components A, B, or C, the apparatus may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   processing a radio frequency (RF) input signal in a receiver in an amplifier-first configuration through a first mixer;

determining whether criteria are met for switching to a mixer-first configuration for the receiver;
when the determining results in determining the criteria are met:
  configuring the receiver to the mixer-first configuration, the configuring comprising bypassing an amplifier of the receiver; and
  processing the RF input signal in the receiver in the mixer-first configuration through a second mixer,
wherein processing the RF input signal in the receiver in the mixer-first configuration comprises adjusting a gain control element before downconverting the RF input signal in the second mixer, the gain control element being separate from the amplifier.

2. The method of claim 1, wherein determining whether criteria are met for switching to the mixer-first configuration comprises determining whether a signal-to-noise ratio (SNR) is above a threshold value.

3. The method of claim 1, wherein determining whether criteria are met for switching to the mixer-first configuration comprises determining whether jammer signals with a signal strength above a threshold value are detected in the RF input signal.

4. The method of claim 1, wherein configuring the receiver to the mixer-first configuration comprises configuring the first mixer as a dummy mixer.

5. The method of claim 4, further comprising:
after configuring the receiver to the mixer-first configuration:
  determining whether second criteria are met for switching to the amplifier-first configuration for the receiver; and
  when determining results in the second criteria are met:
    configuring the receiver to the amplifier-first configuration in which the second mixer is a dummy mixer; and
    processing the RF input signal in the receiver in the amplifier-first configuration through the first mixer.

6. The method of claim 1, wherein configuring the receiver to the mixer-first configuration comprises toggling a switch to configure a processing path for the RF input signal through the gain control element and the second mixer.

7. The method of claim 6, wherein adjusting the gain control element comprises adjusting a gain control element coupled in parallel with a degeneration resistor.

8. The method of claim 1,
wherein processing the RF input signal through the first mixer comprises processing the RF input signal through a first single balanced mixer (SBM), and
wherein processing the RF input signal through the second mixer comprises processing the RF input signal through a second single balanced mixer (SBM).

9. The method of claim 1, further comprising:
determining whether the RF input signal comprises a carrier aggregation (CA) signal; and
based on one or more criteria comprising at least that the RF input signal comprises a CA signal:
  processing at least a first carrier of the CA signal in the amplifier-first configuration through the first mixer; and
  processing at least a second carrier of the CA signal in the mixer-first configuration through the second mixer.

10. The method of claim 9, wherein:
the processing at least a first carrier of the CA signal comprises processing a 5G mm Wave RF signal through the first mixer, and
the processing at least a second carrier of the CA signal comprises processing a 5G sub-7 GHz RF signal through the second mixer.

11. The method of claim 1, wherein the amplifier comprises a low noise amplifier (LNA) of a radio frequency front end (RFFE), the method further comprising:
determining whether second criteria are met while processing the RF input signal in the receiver in the mixer-first configuration through the second mixer; and
when the determining results in determining the second criteria are met:
  configuring the RFFE to bypass the LNA.

12. The method of claim 1, wherein configuring the receiver to the mixer-first configuration comprises closing a switch to couple the RF input signal through a matching network to the second mixer.

13. The method of claim 1, wherein configuring the receiver to the mixer-first configuration comprises configuring an impedance of a switch coupling the RF input signal to the second mixer.

14. The method of claim 1, wherein an output of the gain control element is coupled to an input of the second mixer.

15. An apparatus, comprising:
a receiver, comprising:
  a receive port for receiving an RF input signal;
  a first mixer coupled to the receive port;
  a second mixer coupled to the receive port;
  a low noise amplifier (LNA) coupled between the receive port and the first mixer, wherein the first mixer and the second mixer are coupled to the LNA;
  a switch coupled between the receive port and the LNA, wherein the switch is configured to toggle, at least in part, the receiver between an amplifier-first configuration and a mixer-first configuration,
  a first configurable gain control element coupled to the first mixer and a second configurable gain control element coupled to the second mixer;
  a first degeneration resistor coupled in parallel with the first configurable gain control element between the LNA and the first mixer; and
  a second degeneration resistor coupled in parallel with the second configurable gain control element between the LNA and the second mixer.

16. The apparatus of claim 15, further comprising a second switch coupled between the LNA and the first mixer, coupled between the LNA and the second mixer, and configured to toggle the first mixer from a main mixer to a dummy mixer.

17. The apparatus of claim 15, further comprising:
logic circuitry configured to determine whether criteria are met for switching between the mixer-first configuration and the amplifier-first configuration; and
a radio frequency front end (RFFE) coupled to the receiver, wherein the RFFE comprises:
  a filter; and
  a low noise amplifier (LNA),
  wherein the logic circuitry is configured to bypass at least one of the filter or the LNA of the RFFE based on the criteria.

18. The apparatus of claim 17, wherein the receiver comprises an integrated circuit (IC) separate from the RFFE.

19. The apparatus of claim 15, wherein the switch is configured to switch between the mixer-first configuration and the amplifier-first configuration by bypassing the LNA.

20. The apparatus of claim 15, wherein the second configurable gain control element coupled to the second mixer is configured to adjust a gain of the RF input signal before downconverting the RF input signal in the second mixer.

21. The apparatus of claim 20, wherein the second configurable gain control element is configured to disconnect the RF input signal from the second mixer in the amplifier-first configuration.

22. The apparatus of claim 15, wherein the first mixer comprises a single balanced mixer (SBM), and wherein the second mixer comprises a single balanced mixer (SBM).

23. The apparatus of claim 15, wherein the switch is configured to activate a first processing path to the first mixer, the receiver further comprising a second switch coupled between the receive port and the second mixer, wherein the second switch is configured to activate a second processing path to the second mixer.

24. The apparatus of claim 15, further comprising a second switch coupled between the receive port and the second mixer, wherein the receiver is configured to control an impedance of the second switch to match an input impedance of the second mixer when the receiver is configured in the mixer-first configuration.

25. An apparatus, comprising:
a receiver comprising:
  a receive port for receiving an RF input signal;
  a first set of mixers coupled to the receive port;
  a second set of mixers coupled to the receive port;
  means for configuring the first set of mixers as main mixers in a first mode, the second set of mixers as dummy mixers in the first mode, the first set of mixers as dummy mixers in a second mode, and the second set of mixers as main mixers in the second mode; and
  means for processing baseband signals coupled to outputs of the first set of mixers and to outputs of the second set of mixers.

26. The apparatus of claim 25, wherein the first mode is an amplifier-first mode and the second mode is a mixer-first mode.

27. The apparatus of claim 25, wherein the means for configuring comprise means for coupling only one of the first set of mixers and the second set of mixers to the RF input signal at a time.

28. The apparatus of claim 27, wherein the first set of mixers are in a path coupled to an amplifier, and the second set of mixers are in a path comprising a plurality of gain-control elements.

* * * * *